(12) United States Patent
Zhang et al.

(10) Patent No.: US 10,515,560 B2
(45) Date of Patent: Dec. 24, 2019

(54) SYSTEM AND METHOD FOR OBSTACLE AVOIDANCE IN AERIAL SYSTEMS

(71) Applicant: Hangzhou Zero Zero Technology Co., Ltd., HangZhou, Zhejiang (CN)

(72) Inventors: Lei Zhang, Zhejiang (CN); Xian Su, Zhejiang (CN); Zhaozhe Wang, Zhejiang (CN); Wei Sun, Zhejiang (CN); Tong Zhang, Zhejiang (CN); Mengqiu Wang, Zhejiang (CN)

(73) Assignee: Hangzhou Zero Zero Technology Co., Ltd., Hangzhou (CN)

( * ) Notice: Subject to any disclaimer, the term of this patent is extended or adjusted under 35 U.S.C. 154(b) by 0 days.

(21) Appl. No.: 16/171,703

(22) Filed: Oct. 26, 2018

(65) Prior Publication Data

US 2019/0066524 A1 Feb. 28, 2019

Related U.S. Application Data

(63) Continuation of application No. PCT/CN2018/099309, filed on Aug. 8, 2018.

(Continued)

(51) Int. Cl.
   *G08G 5/04* (2006.01)
   *G08G 5/00* (2006.01)
   (Continued)

(52) U.S. Cl.
   CPC .......... *G08G 5/045* (2013.01); *B64C 39/024* (2013.01); *B64D 47/08* (2013.01); *G05D 1/0094* (2013.01);
   (Continued)

(58) Field of Classification Search
   None
   See application file for complete search history.

(56) References Cited

U.S. PATENT DOCUMENTS 8,855,846 B2 * 10/2014 Grzywna ............. G01C 21/005
                                                            244/189
8,903,568 B1 * 12/2014 Wang .................. G05D 1/0016
                                                              701/2

(Continued)

FOREIGN PATENT DOCUMENTS

CN    104202507 A    12/2014
CN    204978461 U     1/2016

(Continued)

OTHER PUBLICATIONS

International Search Report and Written Opinion (International Application No. PCT/CN2018/099309; dated Nov. 5, 2018; 10 pages.

*Primary Examiner* — Jonathan M Dager
(74) *Attorney, Agent, or Firm* — Howard & Howard Attorneys PLLC

(57) ABSTRACT

An aerial system includes a body, a lift mechanism coupled to the body, a processing system, and at least one camera. The aerial system also includes a first motor configured to rotate the at least one camera about a first axis and a second motor configured to rotate the at least one camera about a second axis. The processing system is configured to determine a direction of travel of the aerial system and to cause the first motor and the second motor to automatically orient the at least one camera about the first axis and the second axis such that the at least one camera automatically faces the direction of travel of the aerial system.

9 Claims, 24 Drawing Sheets

Related U.S. Application Data

(60) Provisional application No. 62/543,671, filed on Aug. 10, 2017.

(51) Int. Cl.

| | | |
|---|---|---|
| *G05D 1/00* | (2006.01) | |
| *B64C 39/02* | (2006.01) | |
| *B64D 47/08* | (2006.01) | |
| *G05D 1/10* | (2006.01) | |
| *H04N 5/225* | (2006.01) | |
| *H04N 13/296* | (2018.01) | |
| *H04N 13/239* | (2018.01) | |

(52) U.S. Cl.
CPC .......... *G05D 1/101* (2013.01); *G08G 5/0078* (2013.01); *H04N 5/2251* (2013.01); *H04N 13/239* (2018.05); *H04N 13/296* (2018.05); *B64C 2201/027* (2013.01); *H04N 2213/001* (2013.01)

(56) References Cited

U.S. PATENT DOCUMENTS

| | | | | |
|---|---|---|---|---|
| 9,720,413 | B1* | 8/2017 | Lema | G05D 1/0088 |
| 10,053,229 | B2* | 8/2018 | Tian | H04N 7/18 |
| 10,067,504 | B1* | 9/2018 | Qu | G05D 1/0061 |
| 10,067,513 | B2* | 9/2018 | Zhang | G06T 7/74 |
| 10,139,837 | B2* | 11/2018 | Qin | B64C 39/024 |
| 2011/0304737 | A1* | 12/2011 | Evans | G01S 3/781 |
| | | | | 348/169 |
| 2013/0166103 | A1* | 6/2013 | Ko | H04N 7/18 |
| | | | | 701/2 |
| 2014/0049643 | A1* | 2/2014 | Segerstrom | F21V 21/30 |
| | | | | 348/144 |
| 2014/0240464 | A1* | 8/2014 | Lee | G01S 17/08 |
| | | | | 348/47 |
| 2014/0336848 | A1* | 11/2014 | Saund | G08G 1/054 |
| | | | | 701/3 |
| 2015/0207964 | A1* | 7/2015 | Bye | H04N 5/2251 |
| | | | | 348/211.99 |
| 2015/0350569 | A1* | 12/2015 | Espersen | H04N 5/33 |
| | | | | 348/164 |
| 2016/0076892 | A1* | 3/2016 | Zhou | B64C 39/024 |
| | | | | 701/3 |
| 2016/0171330 | A1* | 6/2016 | Mentese | G06K 9/3233 |
| | | | | 348/170 |
| 2016/0194079 | A1* | 7/2016 | Montreuil | B64C 39/024 |
| | | | | 701/2 |
| 2016/0274338 | A1* | 9/2016 | Davies | G03B 17/12 |
| 2016/0291445 | A1* | 10/2016 | Fisher, Sr. | G03B 15/006 |
| 2017/0006340 | A1* | 1/2017 | Enke | H04N 21/44028 |
| 2017/0075351 | A1* | 3/2017 | Liu | B64C 39/024 |
| 2017/0121034 | A1* | 5/2017 | Fisher | B64C 39/024 |
| 2017/0198747 | A1* | 7/2017 | Chen | B64D 47/08 |
| 2017/0329324 | A1* | 11/2017 | Bachrach | G05D 1/0016 |
| 2018/0024570 | A1* | 1/2018 | Hutson | F16M 11/123 |
| | | | | 701/4 |
| 2018/0094931 | A1* | 4/2018 | Taylor | G01C 21/00 |
| 2018/0095463 | A1* | 4/2018 | Castleman | B64C 39/024 |
| 2018/0096611 | A1* | 4/2018 | Kikuchi | G08G 5/045 |
| 2018/0129212 | A1* | 5/2018 | Lee | H04N 5/23238 |
| 2018/0136650 | A1* | 5/2018 | Tian | B64C 39/024 |
| 2018/0173220 | A1* | 6/2018 | Wang | G06F 3/04883 |
| 2018/0208311 | A1* | 7/2018 | Zhang | B64C 39/024 |
| 2018/0267561 | A1* | 9/2018 | Trench | G05D 1/101 |
| 2018/0288303 | A1* | 10/2018 | Wang | G01S 17/89 |
| 2018/0302548 | A1* | 10/2018 | Bao | G03B 15/006 |
| 2018/0335178 | A1* | 11/2018 | Bin | F16M 13/04 |
| 2018/0348764 | A1* | 12/2018 | Zhang | G05D 1/0088 |
| 2018/0352170 | A1* | 12/2018 | Zhao | H04N 5/2257 |
| 2018/0359419 | A1* | 12/2018 | Hu | H04N 5/23238 |
| 2018/0362183 | A1* | 12/2018 | Lorell | B64D 47/08 |
| 2019/0002125 | A1* | 1/2019 | Bin | B64D 47/08 |
| 2019/0004512 | A1* | 1/2019 | Liu | H04N 5/247 |
| 2019/0011921 | A1* | 1/2019 | Wang | G05D 1/12 |

FOREIGN PATENT DOCUMENTS

| | | |
|---|---|---|
| CN | 205545532 U | 8/2016 |
| CN | 106161892 A | 11/2016 |
| CN | 106275470 A | 1/2017 |
| CN | 106534628 A | 3/2017 |
| CN | 106989728 A | 7/2017 |
| JP | 447885 B2 | 6/2010 |

* cited by examiner

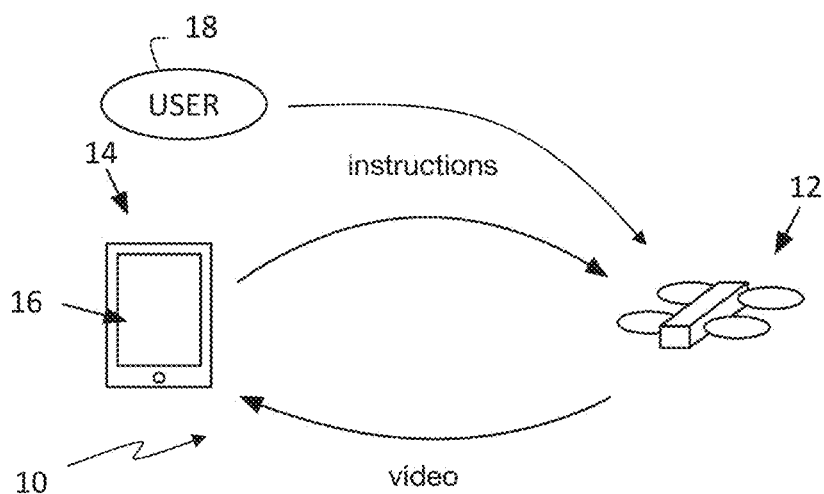
FIGURE 1
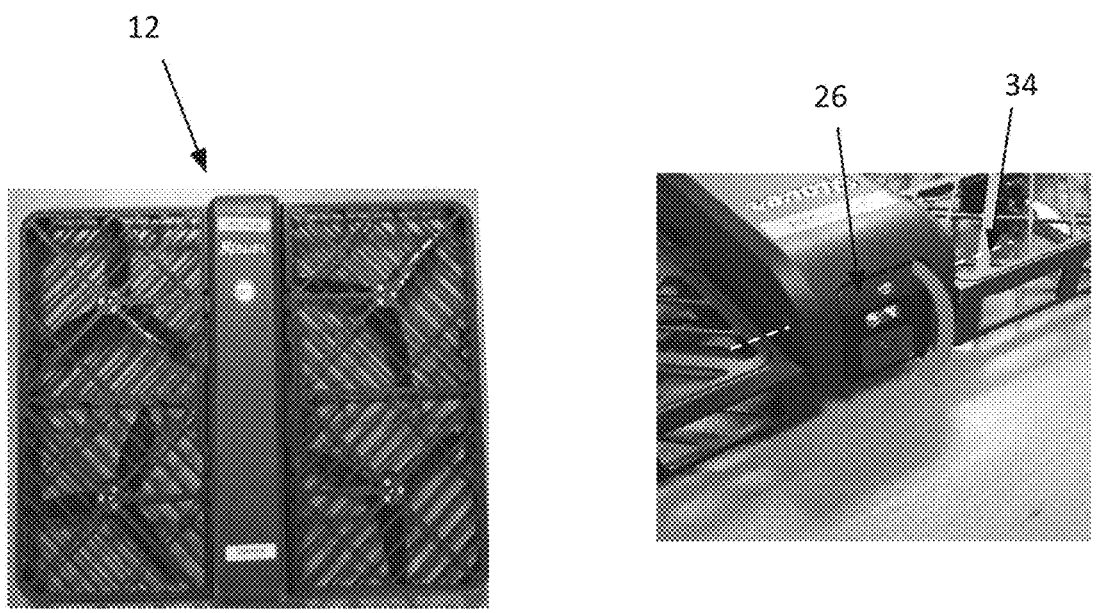
FIGURE 2
FIGURE 3

SYSTEM AND METHOD FOR OBSTACLE AVOIDANCE IN AERIAL SYSTEMS

CROSS-REFERENCE TO RELATED APPLICATION(S)

The present application is a continuation of International Patent Application No. PCT/CN2018/099309, filed Aug. 8, 2018, which claims priority to and the benefit of U.S. Provisional Patent Application Ser. No. 62/543,671, filed Aug. 10, 2017, the entire disclosures of which are hereby incorporated by reference.

TECHNICAL FIELD

This invention relates generally to the aerial system field, and more specifically, to a system and method for providing depth sensing and obstacle avoidance in aerial systems.

BACKGROUND OF THE INVENTION

Depth sensing and obstacle avoidance is a key step toward building a fully autonomous aerial robot. Currently existing drones have demonstrated using sonar, proximity sensor, laser scanning range finder, time-of-flight based sensor, structural light based sensor or a stereovision camera pair to perform depth sensing toward one particular direction (forward/downward), or using multiple depth sensors (such as stereovision camera pairs) facing different directions to attempt obstacle avoidance in more directions. However, the fundamental flaw of this approach is that a rotary-wing drone (such as quadcopter, etc.), unlike a car or a ship, is capable of driving in all directions. A stereovision pairs can only cover a limited range of driving angles. Using brute force to stacking multiple stereovision pairs is very inefficient, and can still fail in obstacle avoidance due to lack of full coverage (360 degrees) of horizontal field angle for depth sensing. Another existing attempt was to use a wide-angle lens or catadioptric lens to capture omnidirectional video information and then using techniques like structure from motion (SFM) or visual inertial odometry (VIO) to achieve single camera depth sensing. This approach relies on extremely accurate SFM/VIO in order to obtain usable absolute depth information. This approach is also vulnerable to vibration and angular movement of the system, which occurs almost constantly on a drone.

In addition, it is desirable to achieve omnidirectional obstacle avoidance for an unmanned aerial vehicle. The current technology is to use a fixed binocular camera so that the unmanned aerial vehicle can sense obstructions in the direction same as the binocular camera. For example, DJI Mavic Air has front binoculars, rear binoculars, and bottom binoculars, so it can avoid obstacles when flying forward or backward but cannot achieve obstacle avoiding when flying leftward or rightward. Skydio R1 can achieve omnidirectional obstacle avoidance, but it has four pairs of binocular cameras.

BRIEF DESCRIPTION OF THE FIGURES

FIG. 1 is a schematic representation of an aerial system and a system for controlling the aerial system, according to an embodiment of the present invention.

FIG. 2 is a picture of an exemplary aerial system, according to an embodiment of the present invention.

FIG. 3 is a picture of an exemplary optical system, according to an embodiment of the present invention.

DETAILED DESCRIPTION OF THE INVENTION

Figure 4:
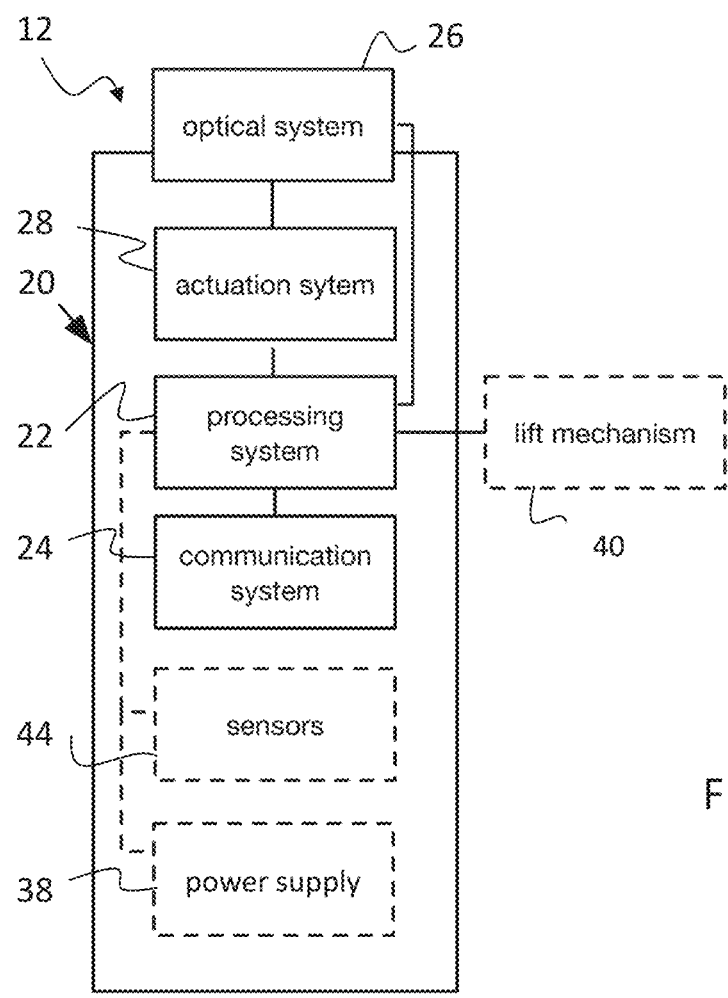
FIG. 4 is a second schematic representation of the aerial system, according to an embodiment of the present invention.

The following description of the embodiments of the invention is not intended to limit the invention to these embodiments, but rather to enable any person skilled in the art to make and use this invention. With reference to the drawings and in operation, a system 10 for controlling an aerial system 12, for example a drone or other unmanned aerial vehicle, is provided. The system 10 may include a remote device 14 with a control client 16. The control client 16 provides a user interface that allows a user 18 to send instructions to the aerial system 12 to control operation thereof. As discussed in more depth below, the aerial system 12 includes one or more cameras for obtaining pictures and/or video which may be sent to the remote device 14 and/or stored in memory on the aerial system 12.

In one aspect of the present invention, the aerial system 12 may include an obstacle detection and avoidance system 50. The obstacle detection and avoidance system 50 may include a pair of cameras 52A, 52B that are utilized to provide obstacle detection and avoidance (see below). The obstacle detection and avoidance system 50 may detect a direction of travel of the aerial system 12 and may automatically adjust an orientation of the cameras 52A, 52B to align with the aerial system 12 direction of travel. Thus, the cameras 52A, 52B may automatically face the direction that the aerial system 12 is moving to improve an efficiency and accuracy of obstacle detection and avoidance in the travel path of the aerial system 12.

Overview of the System 10 and the Aerial System 12

An exemplary aerial system 12 and control system 10 is shown in FIGS. 1-5. The control client 16 of the aerial system 12 functions to receive data from the aerial system 12, including video images and/or video, and control visual display on the remote device 14. The control client 16 may also receive operation instructions and facilitate aerial system 12 remote control based on operation instructions. The control client 16 is preferably configured to execute on a remote device 14, but can alternatively be configured to execute on the aerial system 12 or on any other suitable system. As discussed above, and more fully below, the aerial system 12 may be controlled solely without direct or physical interaction with the remote device 14.

The control client 16 can be a native application (e.g., a mobile application), a browser application, an operating system application, or be any other suitable construct.

The remote device 14 executing the control client 16 functions to display the data (e.g., as instructed by the control client 16), receive user inputs, compute the operation instructions based on the user inputs (e.g., as instructed by the control client 16), send operation instructions to the aerial system 12, store control client information (e.g., associated aerial system identifiers, security keys, user account information, user account preferences, etc.), or perform any other suitable functionality. The remote device 14 can be a user device (e.g., smartphone, tablet, laptop, etc.), a networked server system, or be any other suitable remote computing system. The remote device 14 can include one or more: outputs, inputs, communication systems, sensors, power sources, processing systems (e.g., CPU, memory, etc.), or any other suitable component. Outputs can include: displays (e.g., LED display, OLED display, LCD, etc.), audio speakers, lights (e.g., LEDs), tactile outputs (e.g., a tixel system, vibratory motors, etc.), or any other suitable output. Inputs can include: touchscreens (e.g., capacitive, resistive, etc.), a mouse, a keyboard, a motion sensor, a microphone, a biometric input, a camera, or any other suitable input. Communication systems can include wireless connections, such as radios supporting: long-range systems (e.g., Wi-Fi, cellular, WLAN, WiMAX, microwave, IR, radio frequency, etc.), short-range systems (e.g., BLE, BLE long range, NFC, ZigBee, RF, audio, optical, etc.), or any other suitable communication system. Sensors can include: orientation sensors (e.g., accelerometer, gyroscope, etc.), ambient light sensors, temperature sensors, pressure sensors, optical sensors, acoustic sensors, or any other suitable sensor. In one variation, the remote device 14 can include a display (e.g., a touch-sensitive display including a touchscreen overlaying the display), a set of radios (e.g., Wi-Fi, cellular, BLE, etc.), and a set of orientation sensors. However, the remote device 14 can include any suitable set of components.

The aerial system 12 functions to fly within a physical space, capture video, stream the video in near-real time to the remote device 14, and operate based on operation instructions received from the remote device 14.

The aerial system 12 can additionally process the video (e.g., video frames) prior to streaming the video to the remote device 14 and/or audio received from an onboard audio sensor; generate and automatically operate based on its own operation instructions (e.g., to automatically follow a subject); or perform any other suitable functionality. The aerial system 12 can additionally function to move the optical sensor's field of view within the physical space. For example, the aerial system 12 can control macro movements (e.g., large FOV changes, on the order of meter adjustments), micro movements (e.g., small FOV changes, on the order of millimeter or centimeter adjustments), or any other suitable movement.

The aerial system 12 can perform certain functionality based on onboard processing of sensor data from onboard sensors. This functionality may include, but is not limited to:

Take-off and landing;
Owner recognition;
Facial recognition;
Speech recognition;
Facial expression and gesture recognition; and,
Control, e.g., motion, of the aerial system based on owner, facial, expression and gesture recognition, and speech recognition.

As shown in FIGS. 2-5, the aerial system 12 (e.g., drone) can include a body 20, a processing system 22, a communication system 24, an optical system 26, and an actuation mechanism 28 mounting the optical system 26 to the body 20. The aerial system 12 can additionally or alternatively include one or more optical sensors 36, power supply 38, lift mechanisms 40, additional sensors 44, or any other suitable component (see below).

The body 20 of the aerial system 12 functions to support, mechanically protect, and/or retain the aerial system components. The body 20 can define a lumen, be a platform, or have any suitable configuration. The body 20 can be enclosed, open (e.g., a truss), or have any suitable construction. The body 20 can be made of metal, plastic (e.g., polymer), carbon composite, or any other suitable material. The body 20 can define a longitudinal axis, a lateral axis, a transverse axis, a front end, a back end (e.g., opposing the front end along the longitudinal axis), a top, a bottom (e.g., opposing the top along the transverse axis), or any other suitable reference. In one variation, while in flight, a transverse axis of the body 20 can be substantially parallel a gravity vector (e.g., perpendicular a ground plane) and the body's longitudinal and lateral axes can be substantially perpendicular the gravity vector (e.g., parallel the ground plane). However, the body 20 can be otherwise configured.

The body 20 preferably substantially encapsulates the communication system 24, power supply 38, and processing system 22, but can be otherwise configured. The body 20 can include a platform, a housing, or have any other suitable configuration. In one variation, the body 20 includes a main body housing the communication system 24, power supply 38, and processing system 22, and a first and second frame (e.g., cage) extending parallel the rotor rotational plane and arranged along a first and second side of the main body 20. The frames can function as an intermediary component between the rotating rotors and a retention mechanism (e.g., retention mechanism such as a user's hand). The frame can extend along a single side of the body 20 (e.g., along the bottom of the rotors, along the top of the rotors), along a first and second side of the body 20 (e.g., along the top and bottom of the rotors), encapsulate the rotors (e.g., extend along all sides of the rotors), or be otherwise configured. The frames can be statically mounted or actuatably mounted to the main body 20.

The frame can include one or more apertures (e.g., airflow apertures) fluidly connecting one or more of the rotors to an ambient environment, which can function to enable the flow of air and/or other suitable fluids between the ambient environment and the rotors (e.g., enabling the rotors to generate an aerodynamic force that causes the aerial system 1 to move throughout the ambient environment). The apertures can be elongated, or can have comparable length and width. The apertures can be substantially identical, or can differ from each other. The apertures are preferably small enough to prevent components of a retention mechanism (e.g., fingers of a hand) from passing through the apertures. The geometrical transparency (e.g., ratio of open area to total area) of the frame near the rotors is preferably large enough to enable aerial system flight, more preferably enabling high-performance flight maneuvering. For example, each aperture can be smaller than a threshold size (e.g., smaller than the threshold size in all dimensions, elongated slots narrower than but significantly longer than the threshold size, etc.). In a specific example, the frame has a geometrical transparency of 80-90%, and the apertures (e.g., circles, polygons such as regular hexagons, etc.) each of define a circumscribed circle with a diameter of 12-16 mm. However, the body can be otherwise configured.

The body 20 (and/or any other suitable aerial system components) can define a retention region that can be retained by a retention mechanism (e.g., a human hand, an aerial system dock, a claw, etc.). The retention region preferably surrounds a portion of one or more of the rotors, more preferably completely surrounding all of the rotors, thereby preventing any unintentional interaction between the rotors and a retention mechanism or other object near the aerial system 12. For example, a projection of the retention region onto an aerial system plane (e.g., lateral plane, rotor plane, etc.) can overlap (e.g., partially, completely, a majority of, at least 90% of, etc.) a projection of the swept area of one or more of the rotors (e.g., swept area of a rotor, total swept area of the set of rotors, etc.) onto the same aerial system plane.

The processing system 22 of the aerial system 12 functions to control aerial system operation. The processing system 22 can: stabilize the aerial system 12 during flight (e.g., selectively operate the rotors to minimize aerial system wobble in-flight); receive, interpret, and operate the aerial system 12 based on remote control instructions; and receive operation instructions from the communication system 24, interpret the operation instructions into machine instructions, and control aerial system components based on the machine instructions (individually or as a set). The processing system 22 can additionally or alternatively process the images recorded by the camera, stream images to the remote device 14 (e.g., in real- or near-real time), or perform any other suitable functionality. The processing system 22 can include one or more: processors 30 (e.g., CPU, GPU, microprocessor, etc.), memory (e.g., Flash, RAM, etc.), or any other suitable processing component. In one variation, the processing system 22 can additionally include dedicated hardware that automatically processes the images (e.g., de-warps the image, filters the image, crops the image, etc.) prior to transmission to the remote device 14. The processing system 22 is preferably connected to the active components of the aerial system 12 and mounted to the body 20, but can alternatively be otherwise related to aerial system components.

The processing system 22 is preferably configured to receive and interpret measurements sampled by the sensors 36, 44, more preferably by combining measurements sampled by disparate sensors (e.g., combining camera and accelerometer data). The aerial system 12 can include one or more processing systems, wherein different processors can perform the same functionality (e.g., function as a multi-core system), or be specialized. The processing system 22 is preferably powered by the power supply 38, but can be otherwise powered. The processing system 22 is preferably connected to and controls the sensors 36, 44, communication system 24, and lift mechanism 40, but can additionally or alternatively be connected to and interact with any other suitable component.

The communication system 24 of the aerial system functions to send and/or receive information from the remote device 14. The communication system 24 is preferably connected to the processing system 22, such that the communication system 24 sends and/or receives data form the processing system 22, but can alternatively be connected to any other suitable component. The aerial system 12 can include one or more communication systems 24 of one or more types. The communication system 24 can include wireless connections, such as radios supporting: long-range systems (e.g., Wi-Fi, cellular, WLAN, WiMAX, microwave, IR, radio frequency, etc.), short-range systems (e.g., BLE, BLE long range, NFC, ZigBee, RF, audio, optical, etc.), or any other suitable communication system 24. The communication system 24 preferably shares at least one system protocol (e.g., BLE, RF, etc.) with the remote device 14, but can alternatively communicate with the remote device 14 via an intermediary communication system (e.g., a protocol translation system). However, the communication system 24 can be otherwise configured.

The optical system 26 of the aerial system 12 functions to record images of the physical space proximal the aerial system 12. The optical system 26 is preferably mounted to the body 20 via the actuation mechanism 28, but can alternatively be statically mounted to the body 20, removably mounted to the body 20, or otherwise mounted to the body 20. The optical system 26 is preferably mounted to the front end of the body 20, but can optionally be mounted to the bottom (e.g., proximal the front), top, back end, or any other suitable portion of the body 20. The optical system 26 is preferably connected to the processing system 22, but can alternatively be connected to the communication system 24 or to any other suitable system. The optical system 26 can additionally include dedicated image processing hardware that automatically processes images recorded by the camera prior to transmission to the processor or other endpoint. The aerial system 12 can include one or more optical systems 26 of same or different type, mounted to the same or different position. In one variation, the aerial system 12 includes a first optical system 26, mounted to the front end of the body 20, and a second optical system 26, mounted to the bottom of the body 20. The first optical system 26 can actuate about a pivotal support, and the second optical system 26 can be substantially statically retained relative to the body 20, with the respective active surface substantially parallel the body bottom. The first optical system 26 can include a high-definition optical sensor 36, while the second optical system 26 can include a low definition optical sensor 36. However, the optical system or systems 26 can be otherwise configured.

Figure 5:
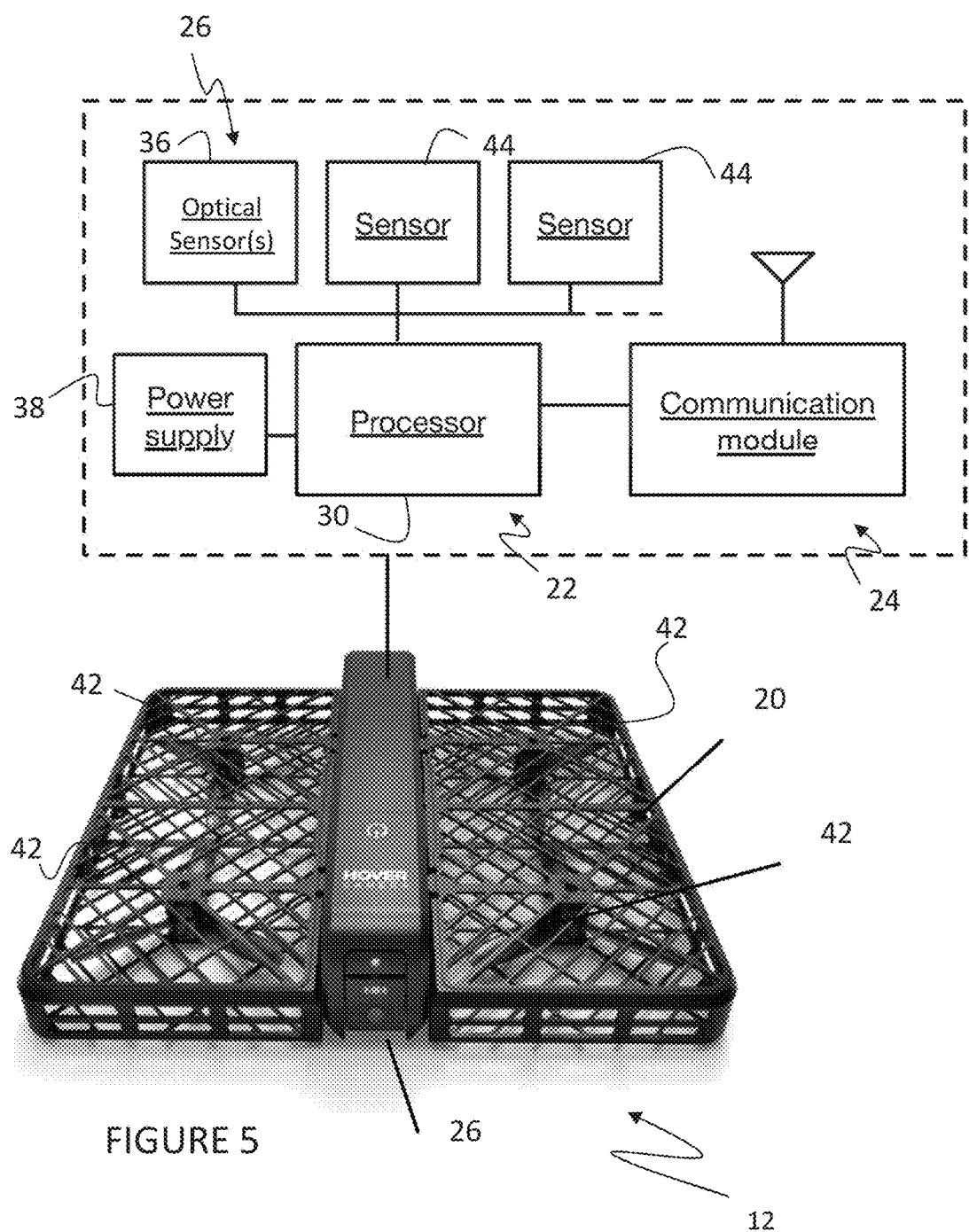
FIG. 5 is a third schematic representation of the system for controlling the aerial system and the aerial system according to an embodiment of the present invention.

The optical system 26 can include one or more optical sensors 36 (see FIG. 5). The one or more optical sensors 36 can include: a single lens camera (e.g., CCD camera, CMOS camera, etc.), a stereo-camera, a hyperspectral camera, a multispectral camera, or any other suitable image sensor. However, the optical system 26 can be any other suitable optical system 26. The optical system 26 can define one or more active surfaces that receive light, but can alternatively include any other suitable component. For example, an active surface of a camera can be an active surface of a camera sensor (e.g., CCD sensor, CMOS sensor, etc.), preferably including a regular array of sensor pixels. The camera sensor or other active surface is preferably substantially planar and rectangular (e.g., having a first sensor edge, a second sensor edge opposing the first sensor edge, and third and fourth sensor edges each perpendicular to and extending from the first sensor edge to the second sensor edge), but can alternatively have any suitable shape and/or topography. The optical sensor 36 can produce an image frame. The image frame preferably corresponds with the shape of the active surface (e.g., rectangular, having a first and second frame edge opposing each other, etc.), more preferably defining a regular array of pixel locations, each pixel location corresponding to a sensor pixel of the active surface and/or pixels of the images sampled by the optical sensor 36, but can alternatively have any suitable shape. The image frame preferably defines aspects of the images sampled by the optical sensor 36 (e.g., image dimensions, resolution, pixel size and/or shape, etc.). The optical sensor 36 can optionally include a zoom lens, digital zoom, fisheye lens, filter, or any other suitable active or passive optical adjustment. Application of the optical adjustment can be actively controlled by the controller, manually controlled by the user 18 (e.g., wherein the user manually sets the adjustment), controlled by the remote device 14, or otherwise controlled. In one variation, the optical system 26 can include a housing enclosing the remainder of the optical system components, wherein the housing is mounted to the body 20. However, the optical system 26 can be otherwise configured.

The actuation mechanism 28 of the aerial system 12 functions to actionably mount the optical system 26 to the body 20. The actuation mechanism 28 can additionally function to dampen optical sensor vibration (e.g., mechanically stabilize the resultant image), accommodate for aerial system roll, or perform any other suitable functionality. The actuation mechanism 28 can be active (e.g., controlled by the processing system), passive (e.g., controlled by a set of weights, spring elements, magnetic elements, etc.), or otherwise controlled. The actuation mechanism 28 can rotate the optical system 26 about one or more axes relative to the body, translate the optical system 26 along one or more axes relative to the body, or otherwise actuate the optical system 26. The optical sensor(s) 36 can be mounted to the support along a first end, along an optical sensor back (e.g., opposing the active surface), through the optical sensor body, or along any other suitable portion of the optical sensor 36.

In one variation, the actuation mechanism 28 can include a motor (not shown) connected to a single pivoted support (e.g., gimbal), wherein the motor pivots the support about the rotational (or gimbal) axis 34 based on instructions received from the controller. The support is preferably arranged with the rotational axis substantially parallel the lateral axis of the body 20, but can alternatively be arranged with the rotational axis at any other suitable orientation relative to the body 20. The support is preferably arranged within a recessed cavity defined by the body 20, wherein the cavity further encompasses the optical sensor 36 but can alternatively be arranged along the body exterior or arranged at any other suitable portion of the body 20. The optical sensor 36 is preferably mounted to the support with the active surface substantially parallel the rotational axis (e.g., with the lateral axis, or axis parallel the lateral axis of the body 20, substantially parallel the rotational axis), but can alternatively be arranged with the active surface arranged at any suitable angle to the rotational axis.

The motor is preferably an electric motor, but can alternatively be any other suitable motor. Examples of electric motors that can be used include: DC motors (e.g., brushed motors), EC motors (e.g., brushless motors), induction motor, synchronous motor, magnetic motor, or any other suitable electric motor. The motor is preferably mounted to the body 20 (e.g., the body interior), electrically connected to and controlled by the processing system 22, and electrically connected to and powered by a power source or system 38. However, the motor can be otherwise connected. The actuation mechanism 28 preferably includes a single motor-support set, but can alternatively include multiple motor-support sets, wherein auxiliary motor-support sets can be arranged orthogonal (or at any other suitable angle to) the first motor-support set.

In a second variation, the actuation mechanism 28 can include a set of pivoted supports and weights connected to the optical sensor 36 offset from the optical sensor center of gravity, wherein the actuation mechanism 28 passively stabilizes the optical sensor 36.

The power supply 38 of the aerial system 12 functions to power the active components of the aerial system 12. The power supply 38 is preferably mounted to the body 20, and electrically connected to all active components of the aerial system 12 (e.g., directly or indirectly), but can be otherwise arranged. The power supply 38 can be a primary battery, secondary battery (e.g., rechargeable battery), fuel cell, energy harvester (e.g., solar, wind, etc.), or be any other suitable power supply. Examples of secondary batteries that can be used include: a lithium chemistry (e.g., lithium ion, lithium ion polymer, etc.), nickel chemistry (e.g., NiCad, NiMH, etc.), or batteries with any other suitable chemistry.

A lift mechanism 40 of the aerial system 12 functions to enable aerial system flight. The lift mechanism 40 preferably includes a set propeller blades 42 driven by one or more motors (not shown), but can alternatively include any other suitable propulsion mechanism. The lift mechanism 40 is preferably mounted to the body 20 and controlled by the processing system 22, but can alternatively be otherwise mounted to the aerial system 12 and/or controlled. The aerial system 12 can include multiple lift mechanisms 40. In one example, the aerial system 12 includes four lift mechanisms 40 (e.g., two pairs of lift mechanisms 40), wherein the lift mechanisms 40 are substantially evenly distributed about the perimeter of the aerial system 12 (e.g., wherein the lift mechanisms 40 of each pair oppose each other across the body 20). However, the lift mechanisms 40 can be otherwise configured.

Additional sensors 44 of the aerial system function to record signals indicative of aerial system operation, the ambient environment surrounding the aerial system 12 (e.g., the physical space proximal the aerial system 12), or any other suitable parameter. The sensors 44 are preferably mounted to the body 20 and controlled by the processing system 22, but can alternatively be mounted to any other suitable component and/or otherwise controlled. The aerial system 12 can include one or more sensors 36, 44. Examples of sensors that can be used include: orientation sensors (e.g., inertial measurement sensors, accelerometer, gyroscope, altimeter, magnetometer, etc.), ambient light sensors, temperature sensors, pressure sensors, optical sensors, acoustic sensors (e.g., transducers, microphones), voltage sensors, current sensors (e.g., Hall effect sensors), air flow meter, touch sensors (e.g., resistive, capacitive, etc.), proximity sensors, force sensors (e.g., strain gauge meter, load cell), vibration sensors, chemical sensors, sonar sensors, location sensor (e.g., GPS, GNSS, triangulation, etc.), or any other suitable sensor.

In one variation, the aerial system 12 includes a first camera mounted (e.g., statically or rotatably) along a first end of the aerial system body with a field of view intersecting the lateral plane of the body; a second camera mounted along the bottom of the aerial system body with a field of view substantially parallel the lateral plane; and a set of orientation sensors, such as an altimeter and accelerometer. However, the system can include any suitable number and arrangement of any sensor type.

The aerial system 12 can additionally include inputs (e.g., microphones, cameras, etc.), outputs (e.g., displays, speakers, light emitting elements, etc.), or any other suitable component.

The aerial system 12 can optionally be used with a remote computing system, or with any other suitable system. The aerial system 12 functions to fly, and can additionally function to take photographs, deliver loads, and/or relay wireless communications. The aerial system 12 is preferably a rotorcraft (e.g., quadcopter, helicopter, cyclocopter, etc.), but can alternatively be a fixed-wing aircraft, aerostat, or be any other suitable aerial system 12.

The remote computing system functions to receive auxiliary user inputs, and can additionally function to automatically generate control instructions for and send the control instructions to one or more aerial systems 12. Each aerial system 12 can be controlled by one or more remote computing systems. The remote computing system preferably controls the aerial system 12 through a client (e.g., a native application, browser application, etc.), but can otherwise control the aerial system 12. The remote computing system can be a user device, remote server system, connected appliance, or be any other suitable system. Examples of the user device include a tablet, smartphone, mobile phone, laptop, watch, wearable device (e.g., glasses), or any other suitable user device. The user device can include power storage (e.g., a battery), processing systems (e.g., CPU, GPU, memory, etc.), user outputs (e.g., display, speaker, vibration mechanism, etc.), user inputs (e.g., a keyboard, touchscreen, microphone, etc.), a location system (e.g., a GPS system), sensors (e.g., optical sensors, such as light sensors and cameras, orientation sensors, such as accelerometers, gyroscopes, and altimeters, audio sensors, such as microphones, etc.), data communication system (e.g., a Wi-Fi module, BLE, cellular module, etc.), or any other suitable component.

The system 10 may be configured for controller-free user drone interaction. Normally, the aerial system, or drone, 12 requires a separate device, e.g., the remote device 14. The remote device 14 may be embodied in different types of devices, including, but not limited to a ground station, remote control, or mobile phone, etc. . . . In some embodiments, control of the aerial system 12 may be accomplished by the user through user expression without utilization of the remote device 14. User expression may include, but is not limited to, any action performed by the user that do not include physical interaction with the remote device 14, including thought (through brain wave measurement), facial expression (including eye movement), gesture and/or voice. In such embodiments, user instructions are received directly via the optical sensors 36 and at least some of the other sensors 44 and processed by the onboard processing system 22 to control the aerial system 12.

In at least one embodiment, the aerial system 12 may be controlled without physical interaction with the remote device 14, however, a display of the remote device 14 may be used to display images and/or video relayed from the aerial system 12 which may aid the user 18 in controlling the aerial system 12. In addition, sensors 36, 44 associated with the remote device 14, e.g., camera(s) and/or a microphone (not show) may relay data to the aerial system 12, e.g., when the aerial system 12 is too far away from the user 18. The sensor data relayed from the remote device 14 to the aerial system 12 is used in the same manner as the sensor data from the on-board sensors 36, 44 are used to control the aerial system 12 using user expression.

In this manner, the aerial system 12 may be fully controlled, from start to finish, either (1) without utilization of a remote device 14, or (2) without physical interaction with the remote device 14. Control of the aerial system 12 based on user instructions received at various on-board sensors 36, 44. It should be noted that in the following discussion, utilization of on-board sensors 36, 44 may also include utilization of corresponding or similar sensors on the remote device 14.

In general, the user 18 may utilize certain gestures and/or voice control to control take-off, landing, motion of the aerial system 12 during flight and other features, such as triggering of photo and/or video capturing. As discussed above, the aerial system 12 may provide the following features without utilization of, or processing by, a remote device 14:

Take-off and landing;
Owner recognition;
Facial recognition;
Speech recognition;
Facial expression and gesture recognition; and,
Control, e.g., motion, of the aerial system based on owner, facial, expression and gesture recognition, and speech recognition.

As detailed above, the aerial system 12 includes an optical system 26 that includes one or more optical sensor 36, such as a camera. The at least one on-board camera is configured for live video streaming and computer vision analysis. Optionally the aerial system 12 can have at least one depth sensor (or stereo-vision pair) for multi-pixel depth sensing. Optionally the aerial system 12 can have at least one microphone on board for voice recognition and control.

In general, in order to provide full control of the aerial system 12, a plurality of user/drone interactions or activities from start to end of an aerial session are provided. The user/drone interactions, include, but are not limited to take-off and landing, owner recognition gesture recognition, facial expression recognition, and voice control.

Obstacle Detection and Avoidance System

Figure 6:
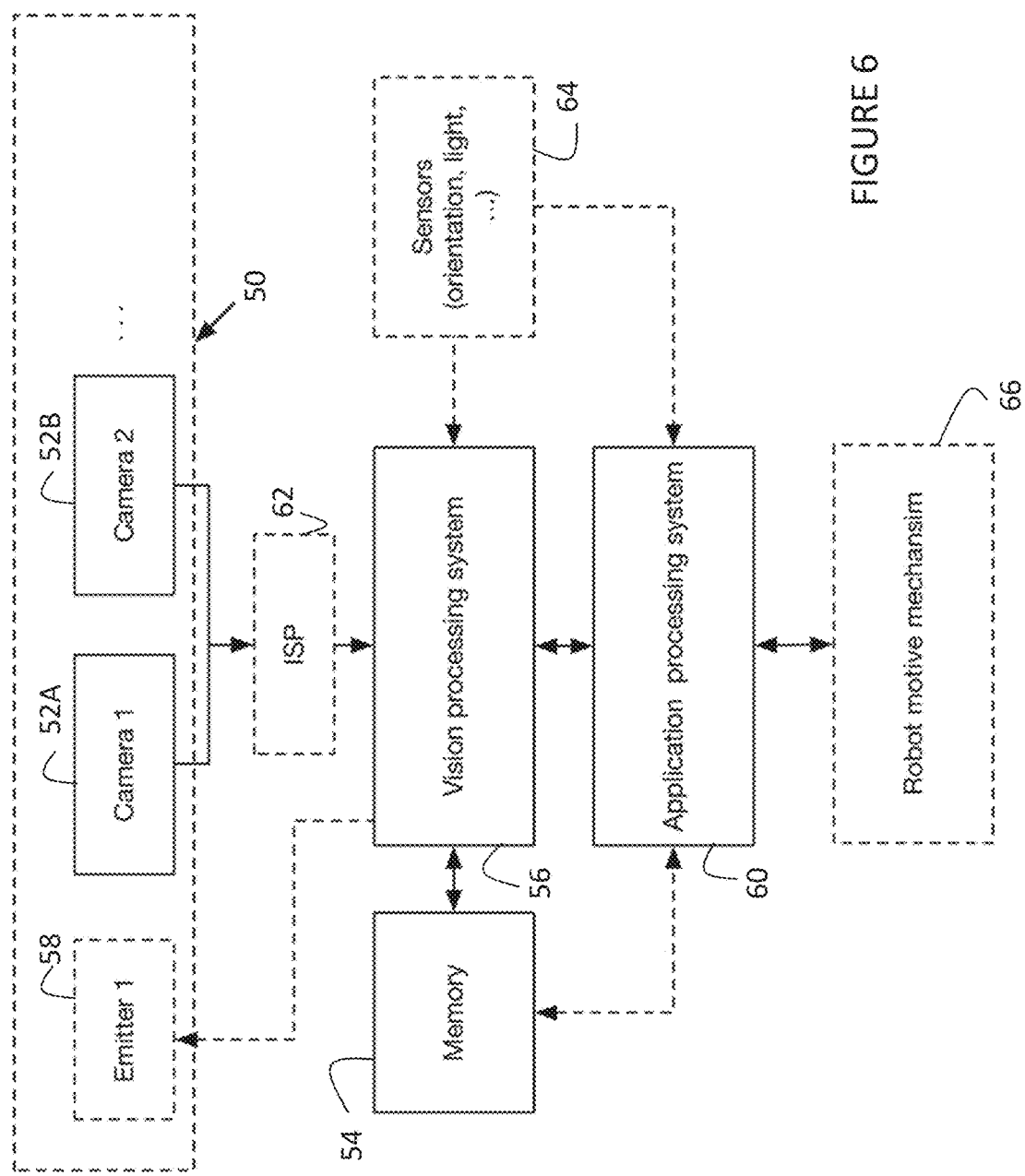
FIG. 6 is a schematic representation of an aerial system including an obstacle detection and avoidance system, according to an embodiment of the present invention.

With reference to FIG. 6, in another aspect of the present invention, the aerial system 12 may include an obstacle detection and avoidance system 50. In one embodiment, the obstacle detection and avoidance system 50 includes a pair of wide angle lens cameras 52A 52B.

The pair of cameras 52A, 52A are generally mounted or statically fixed to a housing of the body 20. A memory 54 and a vision processor 56 are connected to the pair of cameras 52A, 52B. The system functions to sample images of a monitored region for real- or near-real time image processing, such as depth analysis. The system can additionally or alternatively generate 3D video, generate a map of the monitored region, or perform any other suitable functionality.

The housing functions to retain the pair of cameras 52A, 52B in a predetermined configuration. The system preferably includes a single housing that retains the pair of cameras 52A, 52B, but can alternatively include multiple housing pieces or any other suitable number of housing pieces.

The pair of cameras 52A, 52B may function to sample signals of the ambient environment surrounding the system 12. The pair of cameras 52A, 52B are arranged with the respective view cone of each camera overlapping a view cone of the other camera (see below).

Each camera 52A, 52B can be a CCD camera, CMOS camera, or any other suitable type of camera. The camera can be sensitive in the visible light spectrum, IR spectrum, or any other suitable spectrum. The camera can be hyper-spectral, multispectral, or capture any suitable subset of bands. The cameras can have a fixed focal length, adjustable focal length, or any other suitable focal length. However, the camera can have any other suitable set of parameter values. The cameras of the plurality can be identical or different.

Each camera is preferably associated with a known location relative to a reference point (e.g., on the housing), but can be associated with an estimated, calculated, or unknown location. In one embodiment, each camera 52A, 52B may implement bionic features such as independent movement and orientation (i.e., the ability to move and be oriented independently of each other). For example, the application processing system 60 may transmit control signals to each camera 52A, 52B to orient and/or move each camera independently of each other to focus on different objects or to achieve configurable depth-sensing and obstacle avoidance. The pair of cameras 52A, 52B are preferably statically mounted to the housing (e.g., through-holes in the housing), but can alternatively be actuatably mounted to the housing (e.g., by a joint). The cameras can be mounted to the housing faces, edges, vertices, or to any other suitable housing feature. The cameras can be aligned with, centered along, or otherwise arranged relative to the housing feature. The camera can be arranged with an active surface perpendicular a housing radius or surface tangent, an active surface parallel a housing face, or be otherwise arranged. Adjacent camera active surfaces can be parallel each other, at a non-zero angle to each other, lie on the same plane, be angled relative to a reference plane, or otherwise arranged. Adjacent cameras preferably have a baseline (e.g., inter-camera or axial distance, distance between the respective lenses, etc.) of 6.35 cm, but can be further apart or closer together.

The cameras 52A, 52B may be connected to the same visual processing system and memory, but can be connected to disparate visual processing systems and/or memories. The cameras are preferably sampled on the same clock, but can be connected to different clocks (e.g., wherein the clocks can be synchronized or otherwise related). The cameras are preferably controlled by the same processing system, but can be controlled by different processing systems. The cameras are preferably powered by the same power source (e.g., rechargeable battery, solar panel array, host robot power source, separate power source, etc.), but can be powered by different power sources or otherwise powered.

The obstacle detection and avoidance system 50 may also include an emitter 58 that functions to illuminate a physical region monitored by the cameras 52A, 52B. The system 50 can include one emitter 58 for one or more of the cameras 52A, 52B, multiple emitters 58 for one or more of the cameras 52A, 52B, emitters 58, or any suitable number of emitters 58 in any other suitable configuration. The emitter (s) 58 can emit modulated light, structured light (e.g., having a known pattern), collimated light, diffuse light, or light having any other suitable property. The emitted light can include wavelengths in the visible range, UV range, IR range, or in any other suitable range. The emitter position (e.g., relative to a given camera) is preferably known, but can alternatively be estimated, calculated, or otherwise determined.

In a second variation, the obstacle detection and avoidance system 50 operates as a non-contact active 3D scanner. The non-contact system is a time of flight sensor, including a camera and an emitter, wherein the camera records reflections (of the signal emitted by the emitter) off obstacles in the monitored region and determines the distance between the system 50 and the obstacle based on the reflected signal. The camera and emitter are preferably mounted within a predetermined distance of each other (e.g., several mm), but can be otherwise mounted. The emitted light can be diffuse, structured, modulated, or have any other suitable parameter. In a second variation, the non-contact system is a triangulation system, also including a camera and emitter. The emitter is preferably mounted beyond a threshold distance of the camera (e.g., beyond several mm of the camera) and directed at a non-parallel angle to the camera active surface (e.g., mounted to a vertex of the housing), but can be otherwise mounted. The emitted light can be collimated, modulated, or have any other suitable parameter. However, the system 50 can define any other suitable non-contact active system. However, the pair of cameras can form any other suitable optical range finding system.

The memory 54 of the system 50 functions to store camera measurements. The memory can additionally function to store settings; maps (e.g., calibration maps, pixel maps); camera positions or indices; emitter positions or indices; or any other suitable set of information. The system can include one or more pieces of memory. The memory is preferably nonvolatile (e.g., flash, SSD, eMMC, etc.), but can alternatively be volatile (e.g. RAM). In one variation, the cameras 52A, 52B write to the same buffer, wherein each camera is assigned a different portion of the buffer. In a second variation, the cameras 52A, 52B write to different buffers in the same or different memory. However, the cameras 52A, 52B can write to any other suitable memory. The memory 54 is preferably accessible by all processing systems of the system (e.g., vision processor, application processor), but can alternatively be accessible by a subset of the processing systems (e.g., a single vision processor, etc.).

The vision processing system 56 of the system 50 functions to determine the distance of a physical point from the system. The vision processing system preferably determines the pixel depth of each pixel from a subset of pixels, but can additionally or alternatively determine the object depth or determine any other suitable parameter of a physical point or collection thereof (e.g., object). The vision processing system 56 preferably processes the sensor stream from the cameras 52A, 52B.

The vision processing system 56 may process each sensor stream at a predetermined frequency (e.g., 30 FPS), but can process the sensor streams at a variable frequency or at any other suitable frequency. The predetermined frequency can be received from an application processing system 60, retrieved from storage, automatically determined based on a camera score or classification (e.g., front, side, back, etc.), determined based on the available computing resources (e.g., cores available, battery level remaining, etc.), or otherwise determined. In one variation, the vision processing system 56 processes multiple sensor streams at the same frequency. In a second variation, the vision processing system 56 processes multiple sensor streams at different frequencies, wherein the frequencies are determined based on the classification assigned to each sensor stream (and/or source camera), wherein the classification is assigned based on the source camera orientation relative to the host robot's travel vector.

The application processing system 60 of the system 50 functions to determine the time multiplexing parameters for the sensor streams. The application processing system 60 can additionally or alternatively perform object detection, classification, tracking (e.g., optical flow), or any other suitable process using the sensor streams. The application processing system can additionally or alternatively generate control instructions based on the sensor streams (e.g., based on the vision processor output). For example, navigation (e.g., using SLAM, RRT, etc.) or visual odometry processes can be performed using the sensor streams, wherein the system and/or host robot is controlled based on the navigation outputs.

The application processing system 60 can additionally or alternatively receive control commands and operate the system 12 and/or host robot based on the commands. The application processing system 60 can additionally or alternatively receive external sensor information and selectively operate the system and/or host robot based on the commands. The application processing system 60 can additionally or alternatively determine robotic system kinematics (e.g., position, direction, velocity, and acceleration) based on sensor measurements (e.g., using sensor fusion). In one example, the application processing system 60 can use measurements from an accelerometer and gyroscope to determine the traversal vector of the system and/or host robot (e.g., system direction of travel). The application processing system 60 can optionally automatically generate control instructions based on the robotic system kinematics. For example, the application processing system 60 can determine the location of the system (in a physical volume) based on images from the cameras 52A, 52B, wherein the relative position (from the orientation sensors) and actual position and speed (determined from the images) can be fed into the flight control module. In this example, images from a downward-facing camera subset can be used to determine system translation (e.g., using optical flow), wherein the system translation can be further fed into the flight control module. In a specific example, the flight control module can synthesize these signals to maintain the robot position (e.g., hover a drone).

The application processing system 60 can include one or more application processors. The application processor can be a CPU, GPU, microprocessor, or any other suitable processing system. The application processing system 60 can implemented as part of, or separate from, the vision processing system 56, or be different from the vision processing system 56. The application processing system 60 may be connected to the visual processing system 56 by one or more interface bridges. The interface bridge can be a high-throughput and/or bandwidth connection, and can use a MIPI protocol (e.g., 2-input to 1-output camera aggregator bridges—expands number of cameras that can be connected to a vision processor), a LVDS protocol, a DisplayPort protocol, an HDMI protocol, or any other suitable protocol. Alternatively, or additionally, the interface bridge can be a low-throughput and/or bandwidth connection, and can use a SPI protocol, UART protocol, I2C protocol, SDIO protocol, or any other suitable protocol.

The system can optionally include an image signal processing unit (ISP) 62 that functions to pre-process the camera signals (e.g., images) before passing to vision processing system and/or application processing system. The ISP 62 can process the signals from all cameras, the signals from the camera subset, or signals any other suitable source. The ISP 62 can auto-white balance, correct field shading, rectify lens distortion (e.g., dewarp), crop, select a pixel subset, apply a Bayer transformation, demosaic, apply noise reduction, sharpen the image, or otherwise process the camera signals. For example, the ISP 62 can select the pixels associated with an overlapping physical region between two cameras from images of the respective streams (e.g., crop each image to only include pixels associated with the overlapping region shared between the cameras of a stereo-camera pair). The ISP 62 can be a system on a chip with multi-core processor architecture, be an ASIC, have ARM architecture, be part of the vision processing system, be part of the application processing system, or be any other suitable processing system.

The system can optionally include sensors 64 that function to sample signals indicative of system operation. The sensor output can be used to determine system kinematics, process the images (e.g., used in image stabilization), or otherwise used. The sensors 64 can be peripheral devices of the vision processing system 56, the application processing system 60, or of any other suitable processing system. The sensors 64 are preferably statically mounted to the housing but can alternatively be mounted to the host robot or to any other suitable system. Sensors 64 can include: orientation sensors (e.g., IMU, gyroscope, accelerometer, altimeter, magnetometer), acoustic sensors (e.g., microphones, transducers), optical sensors (e.g., cameras, ambient light sensors), touch sensors (e.g., force sensors, capacitive touch sensor, resistive touch sensor), location sensors (e.g., GPS system, beacon system, trilateration system), or any other suitable set of sensors.

The system can optionally include inputs (e.g., a keyboard, touchscreen, microphone, etc.), outputs (e.g., speakers, lights, screen, vibration mechanism, etc.), communication system (e.g., a WiFi module, BLE, cellular module, etc.), power storage (e.g., a battery), or any other suitable component.

The system is preferably used with a host robot that functions to traverse within a physical space. The host robot can additionally or alternatively receive remote control instructions and operate according to the remote control instructions. The host robot can additionally generate remote content or perform any other suitable functionality. The host robot can include one or more: communication modules, motive mechanisms, sensors, content-generation mechanisms, processing systems, reset mechanisms, or any other suitable set of components. The host robot can be a drone, vehicle, robot, security camera, or be any other suitable remote-controllable system. The motive mechanism can include a drivetrain, rotors, jets, treads, rotary joint, or any other suitable motive mechanism. The application processing system is preferably the host robot processing system, but can alternatively be connected to the host robot processing system or be otherwise related. In a specific example, the host robot includes an aerial system (e.g., drone) with a WiFi module, a camera, and the application processing system. The system can be mounted to the top of the host robot (e.g., as determined based on a gravity vector during typical operation), the bottom of the host robot, the front of the host robot, centered within the host robot, or otherwise mounted to the host robot. The system can be integrally formed with the host robot, removably coupled to the host robot, or otherwise attached to the host robot. One or more systems can be used with one or more host robots.

Figure 7:
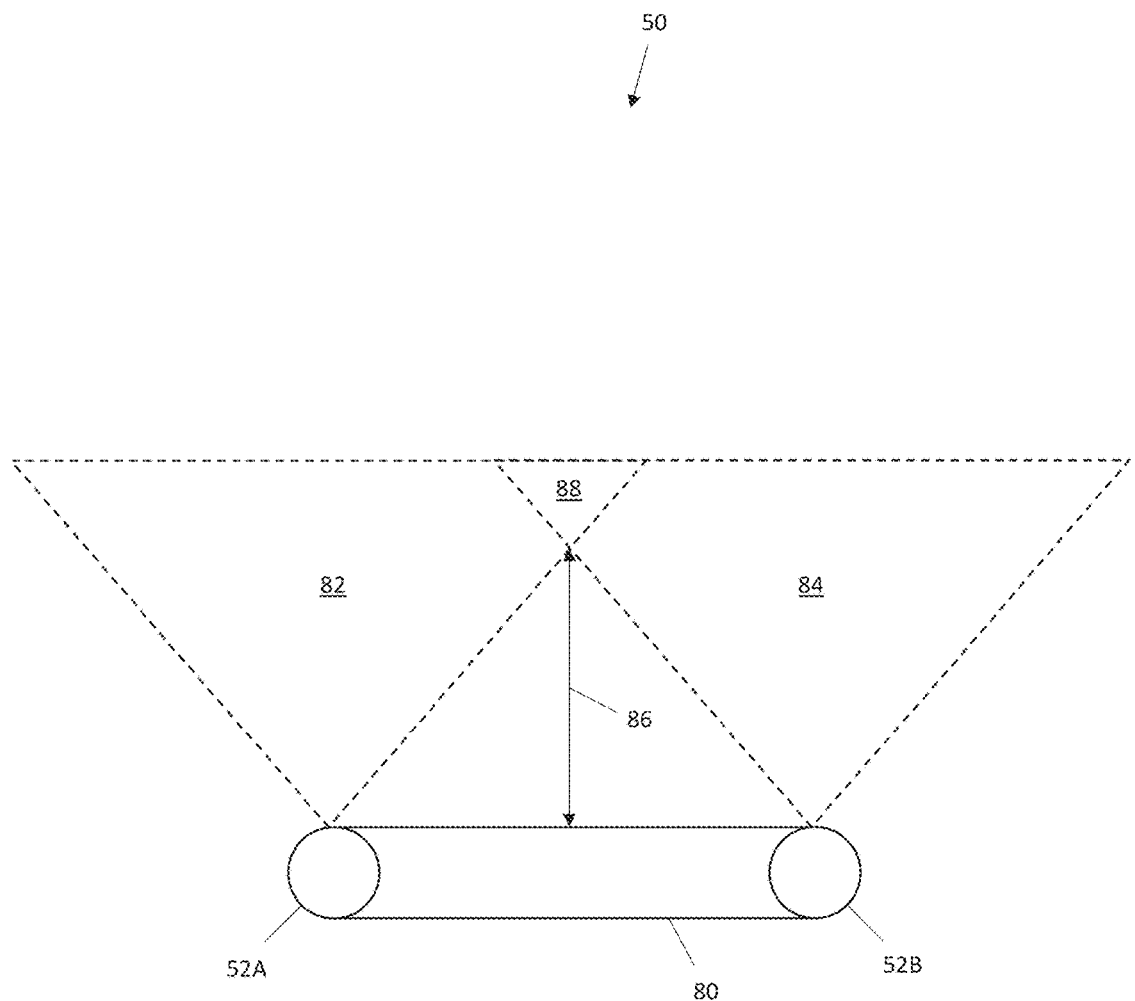
FIG. 7 is a block diagram of a sensor housing of the obstacle detection and avoidance system of FIG. 6, according to an embodiment of the present invention.
Figure 8:
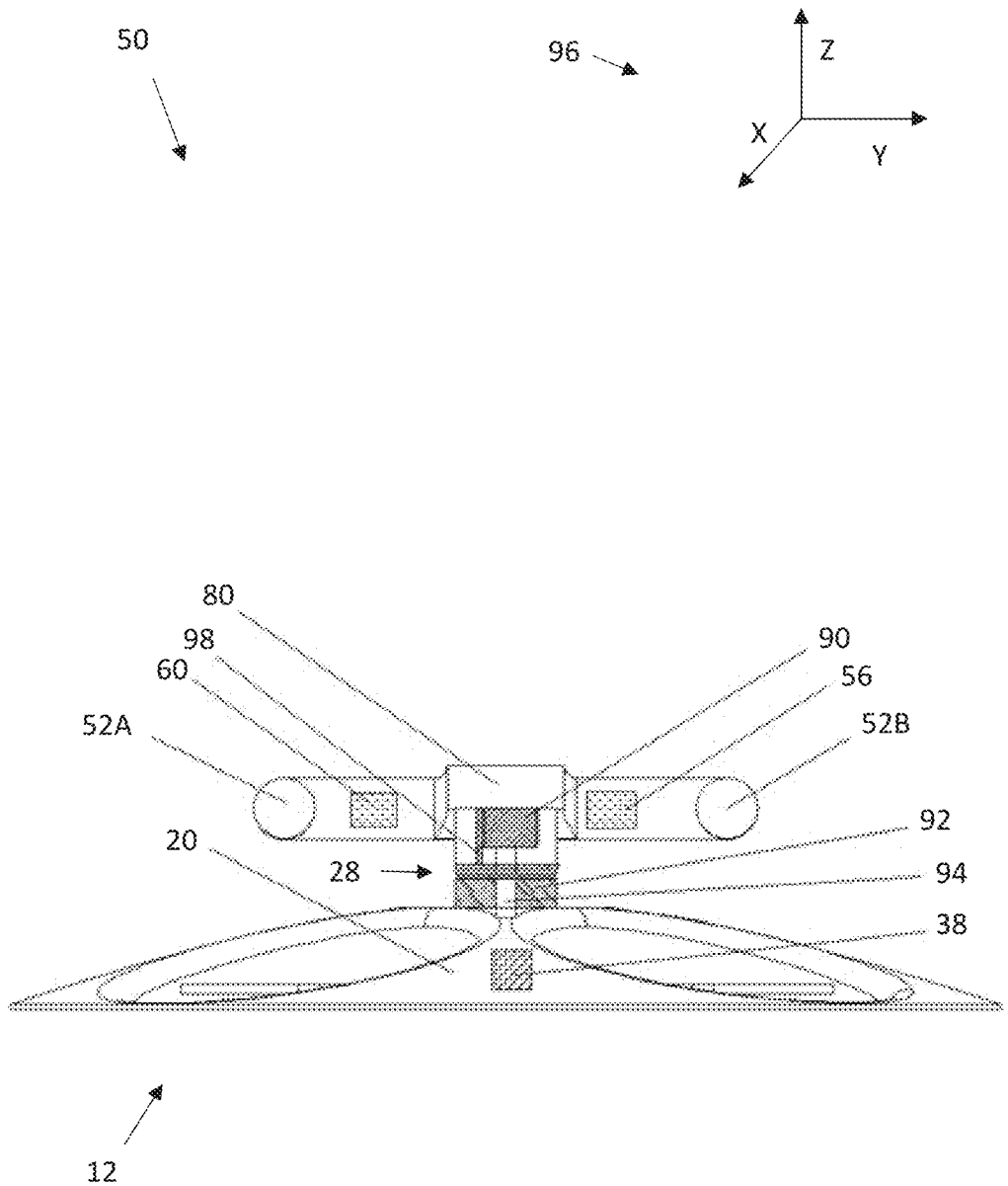
FIG. 8 is side view of an aerial system including the obstacle detection and avoidance system of FIG. 6.
Figure 9:
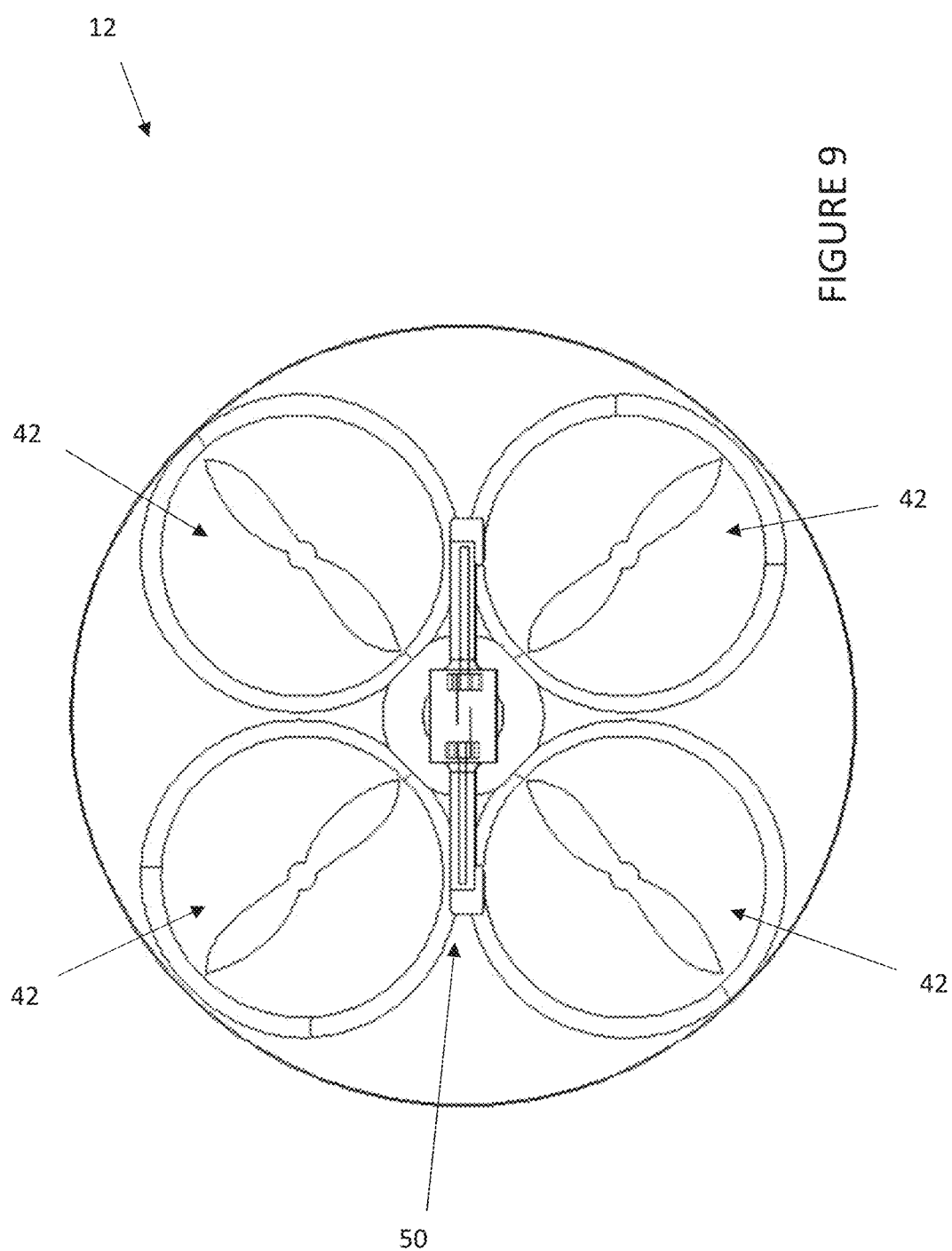
FIG. 9 is a top view of the aerial system of FIG. 8.

With reference to FIGS. 7-9, an aerial system 12 including a specific embodiment of the obstacle detection and avoidance system 50 is shown. In one embodiment, the obstacle detection and avoidance system 50 is configured to achieve binocular depth sensing and obstacle avoidance in the aerial system 12. Alternatively, any suitable depth-sensing mechanism may be used in conjunction with a gimbal as desired to perform the obstacle avoidance functionality described herein. While the embodiments are illustrated and described with reference to the aerial system 12, it should be recognized that the embodiments may be used with any suitable unmanned aerial vehicle, manned aircraft, unmanned vehicle, driverless car, and robotic equipment, for example.

Referring to FIG. 7, the obstacle detection and avoidance system 50 includes a pair of cameras 52A, 52B that are coupled to a sensor housing 80. While two cameras 52A, 52B are illustrated in FIG. 7, it should be recognized that any suitable number of cameras may be used by, or included within, the obstacle detection and avoidance system 50. In some embodiments, the cameras 52A, 52B may be replaced by two or more sonar devices, radar devices, light imaging, detection, and ranging (LIDAR) devices, or other suitable range-finding and obstacle-detecting devices. In another embodiment, the cameras 52A, 52B may be replaced by one or more time-of-flight (TOF) based range imaging or depth cameras. The cameras 52A, 52B may be positioned on opposing ends of the sensor housing 80 and may be oriented to face the same direction to enable the aerial system 12 to achieve binocular vision, in one example. A field of view 82 of camera 52A may overlap a field of view 84 of camera 52B at a distance 86 from the sensor housing 80 to create a combined field of view 88. As a result, the obstacle detection and avoidance system 50 may provide binocular vision, or another depth-sensing mechanism, usable to determine depth of objects positioned at distances greater than distance 86.

In an exemplary embodiment, cameras 52A, 52B are wide angle lens cameras with individual fields of view (FOV) that are selected provide a sufficiently large overlap of the FOVs at near distances. In one embodiment, the field of view of each camera 52A, 52B is at least 60 degrees. Alternatively, the field of view of each camera 52A, 52B is at least 80 degrees, or may be any other suitable value. Preferably, the two cameras 52A, 52B should have the same pixel size, pixel number, and lens design. Pixel correspondence methods can be used to obtain depth information via triangulation. Path and trajectory planning algorithms (such as rapidly-exploring random tree—RRT, A*, etc.) can be applied to generate a desired path of the aerial system 12 to avoid obstacles.

Referring to FIG. 8, the obstacle detection and avoidance system 50 is embodied as a two-axis active gimbal system within the aerial system 12. However, it should be recognized that the obstacle detection and avoidance system 50 may be embodied as a three-axis active gimbal system, or may be embodied in any other suitable configuration as desired.

Referring to FIG. 9, a top view of the aerial system 12 is shown including the obstacle detection and avoidance system 50. As illustrated in FIG. 9, the obstacle detection and avoidance system 50 is positioned on the top of the aerial system 12 (i.e., on the upper side of the body 20). Alternatively, the obstacle detection and avoidance system 50 may be positioned on the bottom of the aerial system 12 (i.e., on the underside of the body 20).

Referring back to FIG. 8, the obstacle detection and avoidance system 50 includes the sensor housing 80 and the actuation mechanism 28 that are coupled to the body 20 of the aerial system 12. As discussed below, the actuation mechanism 28 includes a first motor 90 and a second motor 92 that may rotate sensor housing 80 about respective axes. The body 20 includes a power supply 38 that provides power to the components within the sensor housing 80 and actuation mechanism 28.

The power supply 38 provides a stable power supply for the aerial system 12 and the components therein. The power supply 38 includes protection functions in case of overvoltage, overcurrent and power failure, for example. The power supply 38 can be mounted on the body 20 (as shown in FIG. 8) or on the sensor housing 80.

The sensor housing 80 includes the cameras 52A, 52B, and may also include other sensors, such as sensors 64 (shown in FIG. 6) and/or sensors 44 (shown in FIG. 5). In addition, the sensor housing 80 may include any other combination of cameras, image sensors, radar, sonar, or any other suitable sensors. The sensor housing 80 may also include the vision processing system 56 and the application processing system 60. Alternatively, the vision processing system 56 and/or the application processing system 60 may be positioned within body 20. A data cable 94 is provided to transmit commands from the application processing system 60 to the lift mechanisms 40 (e.g., to the motors driving the propellers 42 of the aerial system 12). In one embodiment, the sensor housing 80 is mounted on motor 90, such as on a rotor of motor 90, using one or more screws, bolts, adhesives, etc.

The vision processing system 56 analyzes camera or other sensor data to detect and facilitate avoiding obstacles and to perform simultaneous localization and mapping (SLAM) functions. The vision processing system 56 may receive data from the cameras 52A, 52B through one or more wired conductors (not shown), a flexible PCB cable (FPC), or the like. The vision processing system 56 may also communicate with the application processing system 60 and with components housed within the body 20 through the data cable 94.

The application processing system 60 includes inertial momentum unit (IMU) and attitude processing functions to determine a direction of travel of the aerial system 12 and an orientation of the sensor housing 80 and/or cameras 52A, 52B within a vehicle coordinate system 96. More specifically, the application processing system 60 receives signal data from one or more orientation sensors (described above) and determines the direction of travel of the aerial system 12 along a plurality of axes, such as an x-axis, a y-axis, and a z-axis of the vehicle coordinate system 96. In addition, the application processing system 60 may receive signals from one or more sensors coupled to the sensor housing 80 or motors 90, 92 to determine the orientation of the sensor housing 80 and/or cameras 52A, 52B along one or more of the x-axis, y-axis, and z-axis of the vehicle coordinate system. It should be recognized that the orientation of the sensor housing 80 is effectively the same as the orientation of the cameras 52A, 52B since the cameras are fixedly coupled to the sensor housing 80. For convenience, the following description will refer to the determination and adjustment of the sensor housing 80 orientation with the understanding that this also applies to the determination and adjustment of the camera 52A, 52B orientation. The application processing system 60 may be coupled to the motors 90, 92 through one or more wired conductors (not shown), a flexible PCB cable (FPC), or the like, to control the operation of the motors 90, 92.

In the embodiment illustrated in FIG. 8, the orientation of the sensor housing 80 may be determined and adjusted with respect to two axes of the vehicle coordinate system 96. For example, the orientation of the sensor housing 80 may be determined about the z-axis (also referred to as the yaw axis) and about the y-axis (also referred to as the pitch axis). Alternatively, the orientation of the sensor housing 80 may be determined about the x-axis (also referred to as the roll axis) in addition to, or in place of, either the z-axis or the y-axis. In one embodiment, the z-axis corresponds to the transverse axis of the body 20, the y-axis corresponds to the lateral axis of the body 20, and the x-axis corresponds to the longitudinal axis of the body 20.

The actuation mechanism 28 includes a first motor 90 and a second motor 92 that provide two-axis orientation of the sensor housing 80. The first motor 90 and the second motor 92 may include, without limitation, a DC brushless motor, a stepper motor, or a servo motor. Alternatively, any other suitable actuator may be used in place of the first motor 90 or the second motor 92. In an exemplary embodiment, the first motor 90 is configured to rotate the sensor housing 80 about the y-axis (i.e., the pitch axis) and is therefore referred to herein as the pitch motor 90. The second motor 92 is configured to rotate the sensor housing 80 about the z-axis (i.e., the yaw axis) and is therefore referred to herein as the yaw motor 92. Thus, the pitch motor 90 may be used to provide stability and to offset motion of the body 20 in the pitching direction while the yaw motor 92 may be used to provide stability and to offset motion of the body 20 in the yaw direction. The pitch motor 90 and the yaw motor 92 are controlled by the application processing system 60 to effectuate a desired rotation about their respective axes. More specifically, the application processing system 60 may transmit command signals to the pitch motor 90 and to the yaw motor 92 to cause the pitch motor 90 and the yaw motor 92 to rotate the sensor housing 80 to a desired degree.

The pitch motor 90 and the yaw motor 92 may be coupled together by a coupling mechanism 98, such as one or more screws, bolts, latches, adhesives, etc. In one embodiment, the pitch motor 90 is positioned at least partially within the sensor housing 80 while the yaw motor 92 is positioned at least partially within the body 20. Alternatively, the pitch motor 90 and the yaw motor 92 may be positioned in any suitable portion of the aerial system 12. The pitch motor 90 and the yaw motor 92 may be coupled to the sensor housing 80 and/or to the body 20 using any suitable mechanism, such as one or more screws, bolts, adhesives, etc. While only two motors are illustrated in FIG. 8, it should be recognized that a third motor (not shown) may be included to provide three-axis orientation of the sensor housing 80 in some embodiments. For example, a roll motor may be provided to rotate the sensor housing 80 about the x-axis (i.e., the roll axis) in some embodiments. The pitch motor 90 and the yaw motor 92 enable the obstacle detection and avoidance system 50 to operate with two degrees of freedom, i.e., pitch and yaw. Alternatively, the motors 90, 92 may enable the obstacle detection and avoidance system 50 to operate in two other degrees of freedom, such as pitch and roll or roll and yaw.

During operation, the application processing system 60 receives data from the orientation sensors and determines an attitude or orientation of the sensor housing 80 (and cameras 52A, 52B) with respect to the vehicle coordinate system 96. Alternatively, the application processing system 60 may receive signals from one or more angular encoders or other sensors attached to one or more gears or shafts of the pitch motor 90 and the yaw motor 92, for example, and may determine the orientation of the sensor housing 80 based on the signals. The application processing system 60 also determines a direction of travel of the aerial system 12 with respect to the vehicle coordinate system 96. Specifically, the application processing system 60 may determine the direction of travel to be a direction along the x-axis, y-axis, and z-axis of the vehicle coordinate system 96.

The application processing system 60 may determine whether the orientation of the sensor housing 80 matches the direction of travel with respect to at least two axes: the pitch axis and the yaw axis. If the orientation of the sensor housing 80 is not aligned with the direction of travel of the aerial system 12, the application processing system 60 automatically adjusts the orientation of the sensor housing 80 to match the direction of travel. Specifically, the application processing system 60 may transmit one or more command signals to the pitch motor 90 and/or the yaw motor 92 to cause the motors to rotate the sensor housing 80 into an orientation that matches the direction of travel of the aerial system 12.

With the orientation of the sensor housing 80 and the cameras 52A, 52B being automatically adjusted to match the direction of travel of the aerial system 12, the cameras 52A, 52B provide binocular or other suitable depth-sensing vision of the environment within the FOV of the cameras 52A, 52B and any obstacles in the travel path of the aerial system 12. The vision processing system 56 receives image signals from the cameras 52A, 52B and analyzes the images to detect obstacles in the travel path of the aerial system 12. The vision processing system 56 uses the overlapping FOV of the cameras 52A, 52B to sense depth in the image data, thus improving the ability of the vision processing system 56 to determine whether any obstacles are in the travel path and how distant the obstacles are. The vision processing system 56 transmits data representative of any detected obstacles to the application processing system 60, and the application processing system 60 may adjust the travel path of the aerial system 12 to avoid the obstacles. For example, the application processing system 60 may transmit one or more command signal to the lift mechanisms 40 (e.g., to the motors of the propeller blades 42) to cause the lift mechanisms 40 to redirect the direction of travel of the aerial system 12 away from the detected obstacles.

In such a manner, the object detection and avoidance system 50 operates as a bionic active gimbal system that mimics a human's ability to detect and avoid obstacles. For example, the head and eyes of a human typically face the direction that the human is moving, and the eyes are rotatable about a yaw axis and a pitch axis to detect obstacles. By mimicking a human's obstacle detection and avoidance abilities, the aerial system 12 is enabled to provide a robust and efficient obstacle detection and avoidance system that only requires two motors to position the cameras 52A, 52B in an optimal position to detect obstacles. In addition, the obstacle detection and avoidance system 50 only requires two wide angle cameras 52A, 52B to achieve a robust level of obstacle detection, as compared to other systems that typically require either omnidirectional cameras or four or more pairs of cameras to detect obstacles in an omnidirectional fashion.

In another embodiment, as the aerial system 12 flies in a particular direction, the cameras 52A, 52B may alternatingly process images in different directions. For example, each camera 52A, 52B may be focused in the direction of travel for a portion of the time (e.g., 50% of the time) and may be focused to one or more sides of the aerial system 12 for another portion of time (e.g., 25% of the time for each side). In one embodiment, the images captured by cameras 52A, 52B while facing the direction of travel of the aerial system 12 may be at a different resolution or rate than the resolution or rate at which the cameras 52A, 52B capture images to the side of the aerial system. For example, the cameras 52A, 52B may capture images at 30 frames per second (FPS) while facing the direction of travel, and may capture images at 15 FPS while facing to the side. Thus, the obstacle detection and avoidance system 50 may maintain the focus of the obstacle detection and avoidance primarily in the direction of travel, but may also maintain an awareness of objects that are not in the direction of travel to enable the aerial system 12 to steer or shift its position in another direction than the direction of travel as needed. It should be recognized that the embodiments described herein are merely examples, and the cameras 52A, 52B may be configured in any suitable manner as desired.

Accordingly, the embodiments described herein provide a stable, reliable, and low-cost obstacle detection and avoidance scheme. The obstacle detection and avoidance system 50 described herein may maintain a stability of the aerial system 12 and cameras 52A, 52B in the pitch direction and in the yaw direction.

The obstacle detection and avoidance system 50 may also orient the cameras 52A, 52B or other sensors in the direction of travel so that the center region of the combined field of view (FOV) of the cameras 52A, 52B (where the depth sensor precision is the often the highest) always faces the direction in which the attention of the sensors should be focused to optimally avoid obstacles. In embodiments that include a binocular pair of cameras 52A, 52B, the obstacle detection and avoidance system saves costs and reduces weight because the obstacle detection and avoidance system only needs a pair of cameras to achieve omnidirectional obstacle avoidance, while other products need four or more pairs of cameras to realize the approximate function. The embodiments described herein also provide for a simpler aerial vehicle assembly due to the reduced number of parts needed as compared to other known implementations.

Furthermore, the obstacle detection and avoidance system described herein may be rotated in any direction desired by the application processing system, and can achieve omnidirectional obstacle avoidance with a highly flexible operation. For example, when operating the aerial vehicle in a vertical take-off mode, the aerial system 12 may detect and avoid obstacles above the system 12 since the cameras 52A, 52B for detecting obstacles are automatically adjusted to focus upwards.

Rotatable Binocular Camera System

Figure 10:
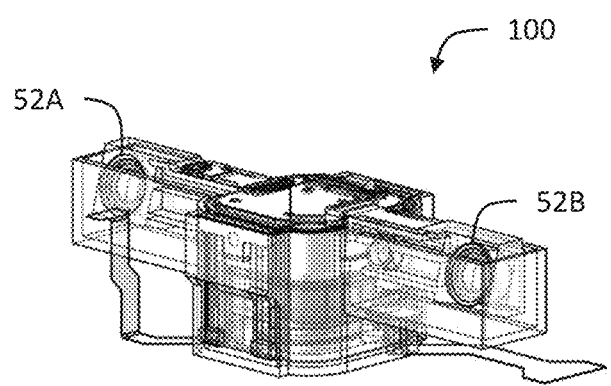
FIG. 10 is a perspective view of a rotatable binocular camera system, according to an embodiment of the present invention.

With reference to FIG. 10, in yet another aspect of the present invention, the aerial system 12 may include a rotatable binocular camera system 100, which is mainly to cooperate with unmanned aerial system 12 to achieve 360 degree omnidirectional obstacle avoidance. The unmanned aerial system 12 is able to perceive obstacles in all directions by using the rotatable binocular camera system 100. On this basis, the unmanned aerial system 12 can make corresponding obstacle avoidance strategies and trajectory planning. In one embodiment, the rotatable binocular camera system 100 is designed to rotate at least three hundred sixty (360) degrees. In another embodiment, the range of rotation of the rotatable binocular camera system 100 is designed to be four hundred fifty (450) degrees. That is, the rotatable binocular camera system 100 can rotate two hundred twenty-five (225) degrees clockwise or counterclockwise from the front direction of the unmanned aerial system 12. It should be appreciated that the unmanned aerial system 12 achieves omnidirectional obstacle avoidance using only one pair of rotatable binocular cameras 52A and 52B.

In one embodiment, the rotatable binocular camera system 100 is able to bounce up and be pushed down relative to the body 20. First, it is convenient for storage. The rotatable binocular camera system 100 can bounce up from the body 20 when in use and be pushed down into the body 20 when not in use. Second, when in use, the viewing position of the rotatable binocular camera system 100 is higher than the top surface of the body 20 to cover wider vertical field of view instead of largely being blocked by the body 20.

In one embodiment, a high-precision four hundred fifty (450) degree rotation brushless gimbal motor 132 is used to achieve accurate rotation of the rotatable binocular camera system 100. The rotatable binocular camera system 100 can achieve omnidirectional depth sensing, and map the depth information to achieve trajectory planning and omnidirectional obstacle avoidance. It should be appreciated that the rotatable binocular camera system 100 allows the unmanned aerial system 12 to achieve omnidirectional obstacle avoidance with a simple, low cost, and compact system solution.

Figure 11:
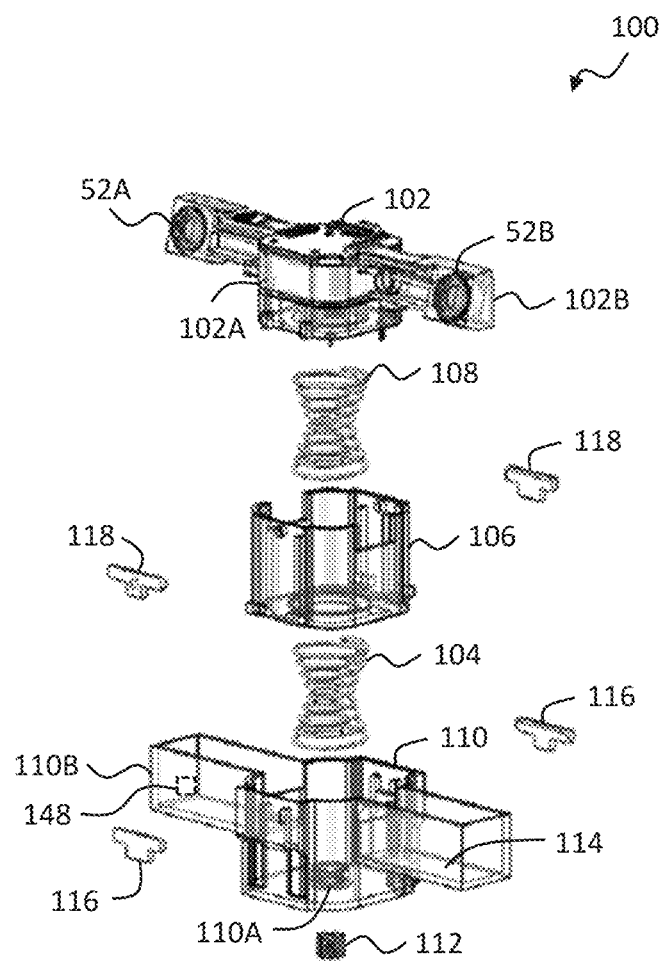
FIG. 11 is an exploded view of the rotatable binocular camera system of FIG. 10.

One embodiment of the rotatable binocular camera system 100 is illustrated in FIG. 10. The rotatable binocular camera system 100 includes an inner module 102, a first spring 104, a middle module 106, a second spring 108, and an outer module 110 as illustrated in FIG. 11. In one embodiment, the first spring 104 and second spring 108 are of a coil type. The inner module 102 and outer module 110 each have a central portion 102A and 110A, respectively, extending axially that is generally rectangular in shape, but may be any suitable shape, and an arm portion 102B and 110B extending radially outwardly from the central portion 102A and 110A, respectively. The arm portion 102B and 110B is generally rectangular in shape, but may be any suitable shape. The middle module 106 is generally rectangular in shape, but may be any suitable shape, to cooperate with the central portion 102A and 110A of the inner module 102 and outer module 110, respectively. The rotatable binocular camera system 100 also includes a push-push socket slot 112, a Hall-effect sensor board 114, an outer block 116, and a middle block 118. In one embodiment, the Hall-effect sensor board 114 is generally rectangular in shape, but may be any suitable shape. In one embodiment, one or more outer block 116 and middle block 118 are provided on opposed sides of the outer module 110 and middle module 106 and are generally "T" shape, but may be any suitable shape. It should be appreciated that the cameras 52A and 52B are mounted to the arm portion 102B of the inner module 102. It should also be appreciated that the rotatable binocular camera system 100 allows for a two-stage bouncing, push-push function, and four hundred fifty (450) degree rotation.

Two-Stage Bouncing

Figure 12:
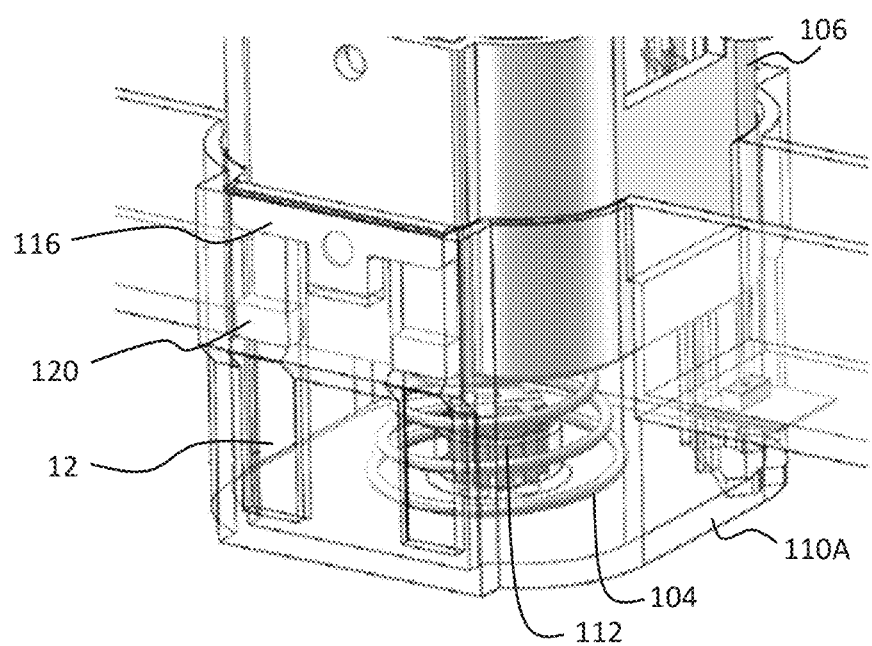
FIG. 12 is a partial perspective view of the rotatable binocular camera system of FIG. 10 in a first stage bounce operational position.

The outer module 110 is equipped with the push-push socket slot 112 and the Hall-effect sensor board 114. One or more Hall-effect sensor boards 114 may be provided such that one of the Hall-effect sensor boards 114 is disposed in the arm portion 110B of the outer module 110. The outer module 110 and the middle module 106 are connected by the first spring 104. The first spring 104 is disposed between a bottom of the central portion 110A of the outer module 110 and a bottom of the middle module 106. The middle module 106 includes at least one guiding slider 120 and the outer module 110 includes at least one guiding slot 122. In one embodiment, a pair of guiding sliders 120 and guiding slots 122 are provided on opposed sides of the central portion 110A of the outer module 110 and the middle module 106 and are generally rectangular in shape, but may be any suitable shape. The guiding slider 120 can slide inside the guiding slot 122, and an upward force is provided through the first spring 104 to achieve a first-stage bouncing/sliding-up as illustrated in FIG. 12. It should be appreciated that the outer block 116 is disposed in the outer module 110 on opposed sides thereof and limits the end position of the sliding-up movement.

Figure 13:
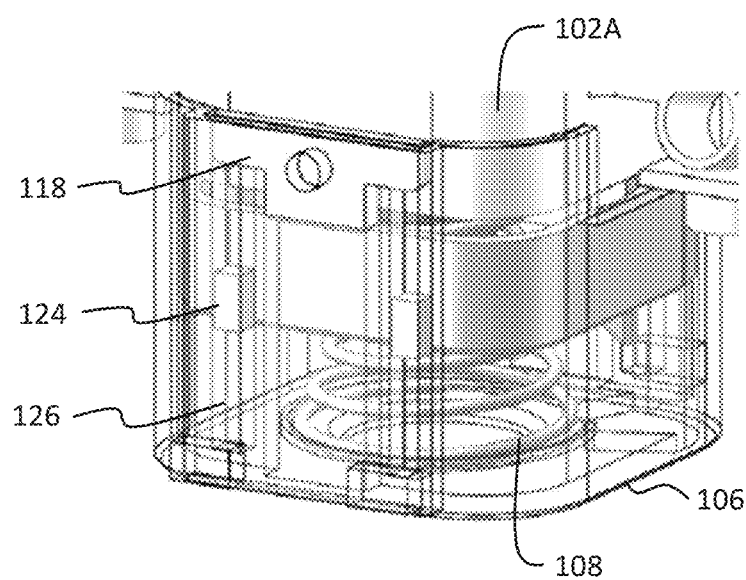
FIG. 13 is a partial perspective view of the rotatable binocular camera system of FIG. 10 in a second stage bounce operational position.

The middle module 106 and inner module 102 are connected by the second spring 108. The second spring 108 is disposed between a bottom of the middle module 106 and a bottom of the central portion 102A of the inner module 102. The bottom of the inner module 102 includes at least one guiding slider 124 extending outwardly and the middle module 106 includes at least one guiding chute 126 extending axially and recessed therein. In one embodiment, a pair of guiding sliders 124 and the guiding chutes 126 are provided on opposed sides of the middle module 106 and the central portion 102A of the inner module 102 and are generally rectangular in shape, but may be any suitable shape. The guiding slider 124 and the guiding chute 126 cooperate with each other to provide an upward force through the second spring 108 and achieve a second-stage bounce with the middle block 118 which provides limit as illustrated in FIG. 13. It should be appreciated that the middle block 118 is disposed in the middle module 106 on opposed sides thereof. It should also be appreciated that the bouncing can also be achieved with a one stage mechanism or a multi-stage mechanism by decreasing or increasing the number of springs 104 and 108 and middle layers on the basis of the two-stage bouncing scheme.

Push-Push Function

Figure 14:
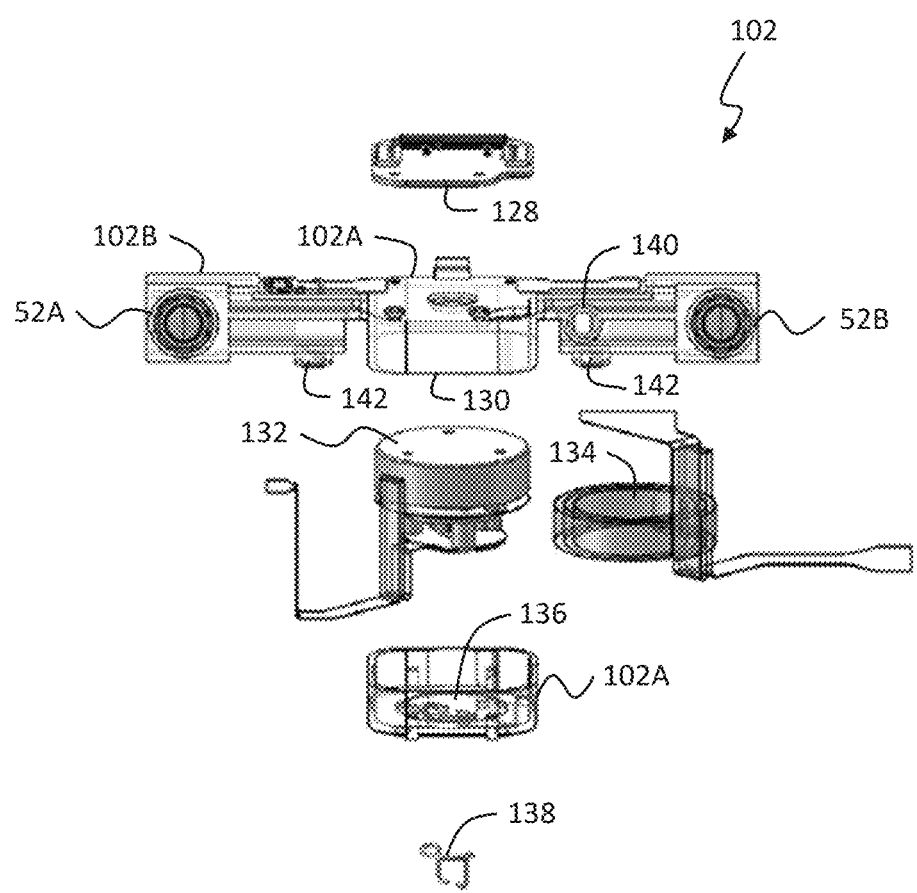
FIG. 14 is an exploded view of an inner module of the rotatable binocular camera system of FIG. 10.
Figure 15:
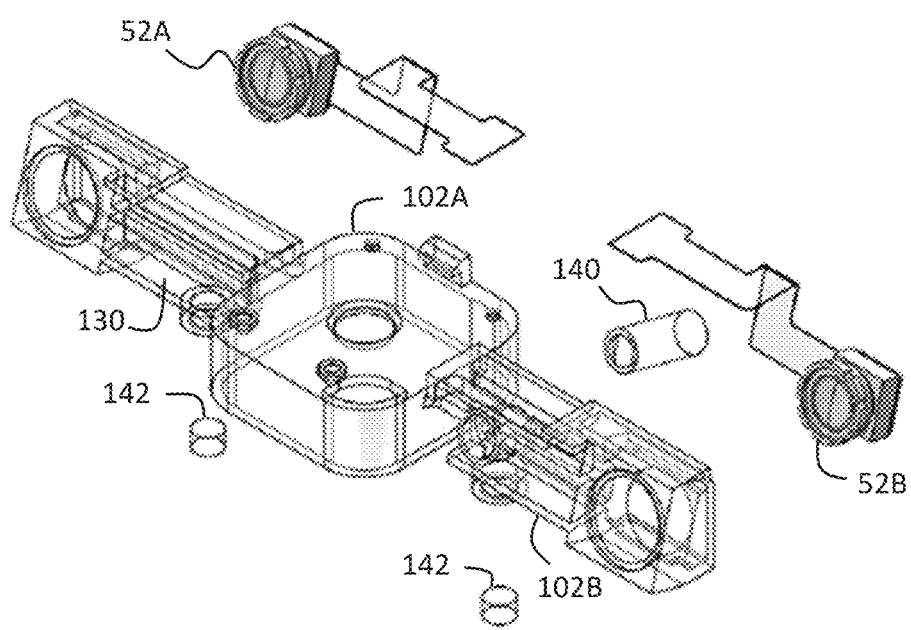
FIG. 15 is an exploded view of a binocular arm module of the inner module of FIG. 14.

The inner module 102 is a core component of the rotatable binocular camera system 100. In one embodiment, the inner module 102 includes an adapter board 128, binocular arm module 130, gimbal motor 132, FPC cable and connector 134, inner bottom 136, and bent wire hook 138 as illustrated in FIG. 14. The binocular arm module 130 forms both portions of the central portion 102A and arm portion 102B of the inner module 102 and the inner bottom 136 also forms the central portion 102A. The binocular arm module 130 also includes left and right camera modules or cameras 52A and 52B coupled thereto, a line laser 140, and at least one magnet 142 as illustrated in FIG. 15. In one embodiment, the left and right cameras 52A and 52B are disposed in and near outer ends of the binocular arm module 130 and form a binocular, realizing the perception of obstacles. In one embodiment, the line laser 140 is disposed in the binocular arm module 130 and emits infrared light that is invisible to the naked eye. In one embodiment, a laser surface of the laser line 140 is generally perpendicular to an axis of the binocular arm module 130. In one embodiment, a pair of magnets 142 are disposed in a bottom of the binocular arm module 130 and are round or circular in shape, but may be any suitable shape. It should be appreciated that the function of the line laser 140 is that, when the unmanned aerial system 12 encounters a large area of solid-colored object/plane with no pattern (such as a blank wall), the rotatable binocular camera system 100 can still perceive depth information correctly with the line laser 140 projecting a line pattern on the object/plane. It should also be appreciated that, when the magnet 142 approaches the Hall-effect sensor board 114 on the outer module 110, a trigger signal will be generated to detect whether the binocular arm module 130 is in a storage state. It should further be appreciated that the function of the adapter board 128 is to connect a FPC of the left and right camera modules 52A and 52B, and then transfer out one FPC cable and connector 134 and connect it to the unmanned aerial system 12.

Figure 16:
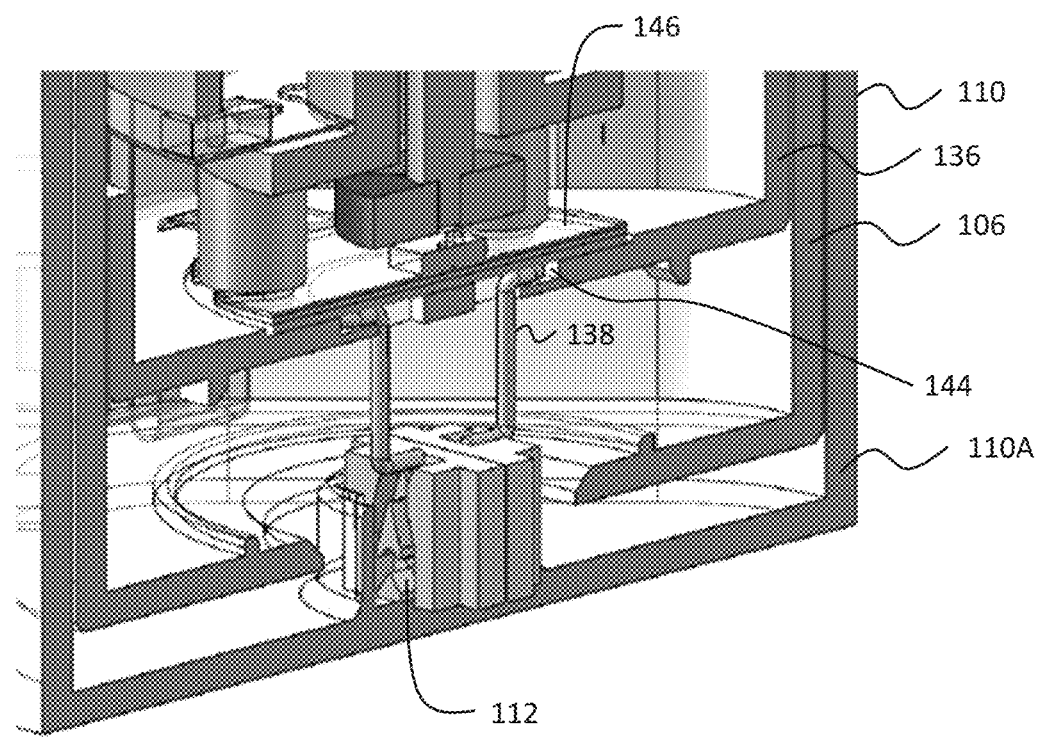
FIG. 16 is a sectional view of a portion of the rotatable binocular camera system of FIG. 10 in a depressed mode.

Referring to FIG. 16, the inner bottom 136 is provided with a slot 144, in which the bent wire hook 138 can be embedded and then pressed by a pressing board 146, and the inner bottom 136 and a stator part 162 of the gimbal motor 132 are fixed by a suitable mechanism such as screws (not shown). In one embodiment, the bent wire hook 138 is generally "U" shaped, but may be any suitable shape. One end of the bent wire hook 138 is sandwiched in the middle and is positioned by the slot 144 to complete the installation and fixation of the bent wire hook 138. The other end of the bent wire hook 138 extends downwardly to engage the push-pull slot 112. The push-push socket slot 112 is fixed to the outer module 110 by a suitable mechanism such as screws (not shown).

Figure 17:
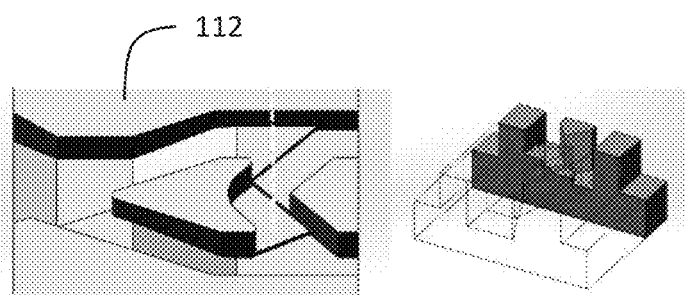
FIG. 17 is a perspective view of a portion of a push-push socket slot of the rotatable binocular camera system of FIG. 10.
Figure 18:
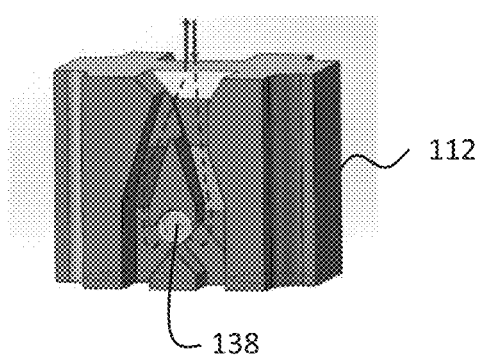
FIG. 18 is a perspective view of a trajectory of a bent wire hook in the push-push socket slot of the rotatable binocular camera system of FIG. 10.

As illustrated in FIG. 16, when the inner module 102 is pressed down, the bent wire hook 138 gradually approaches the push-push socket slot 112, and when the end of the bent wire hook 138 enters the push-push socket slot 112, there will be a movement trajectory as shown by solid and dotted lines in FIG. 18, thereby realizing self-locking when pressed once and unlocking when pressed once again. As illustrated in FIG. 17, there are three steps on the profile of the push-push socket slot 112 to ensure that the bent wire hook 138 can only move in a single direction, thereby achieving the trajectory shown in FIG. 18. It should be appreciated that, in addition to the push-push structure to accommodate the binocular arm module 130, other suitable methods can also be implemented, such as fastening, latching and magnet pull-in.

Hall-Effect Sensor

In one embodiment, a Hall-effect sensor 148 (FIG. 11) is mounted on an outer surface of the arm portion 110B and the magnet 142 is mounted on the binocular arm module 130. When the binocular arm module 130 is pressed down, the distance between the magnet 142 and the Hall-effect sensor 148 becomes smaller. When the distance reaches a preset threshold, the Hall-effect sensor 148 will generate a signal, so that it can recognize whether the binocular arm module 130 is pressed down. When the binocular arm module 130 bounces up, the distance between the magnet 142 and the Hall-effect sensor 148 becomes larger. When the distance reaches a preset threshold, the Hall-effect sensor 148 will generate a signal, so that it can recognize whether the binocular arm module 130 bounces up.

Gimbal Motor (with 450 Degree Rotation Travel Range)

Figure 19:
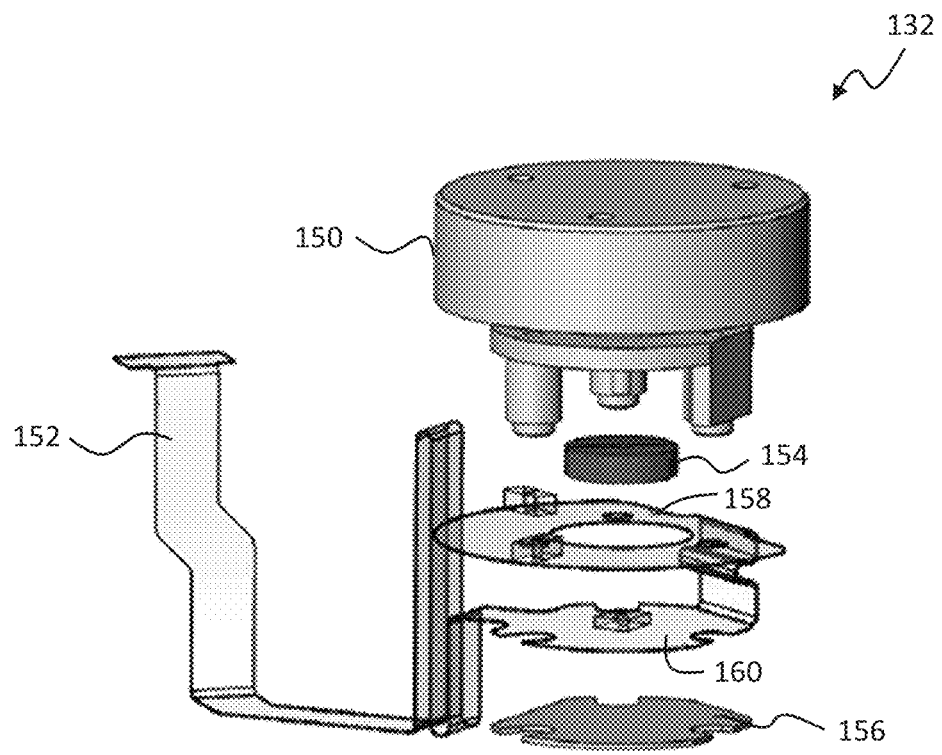
FIG. 19 is an exploded view of a gimbal motor of the rotatable binocular camera system of FIG. 10.

Referring to FIG. 19, the gimbal motor 132 is of a brushless type. The gimbal motor 132 includes a motor body 150, a one-piece FPC 152, a magnet 154, and a cover plate 156. In one embodiment, the motor body 150 is generally cylindrical in shape with a circular shape, but may be any suitable shape. In one embodiment, the magnet 154 is round or circular in shape, but may be any suitable shape. In one embodiment, the cover plate 156 is generally circular in shape, but may be any suitable shape. The one-piece FPC 152 integrates a Hall-effect sensor board 158 (which realizes motor drive control) and a magnetic encoder board 160 (which realizes high-precision angle control of the motor), realizing the miniaturization and compactness of the structure. It should be appreciated that the Hall-effect sensor board 158 and magnetic encoder board 160 are disposed between the motor body 150 and the cover plate 156.

Figure 20:
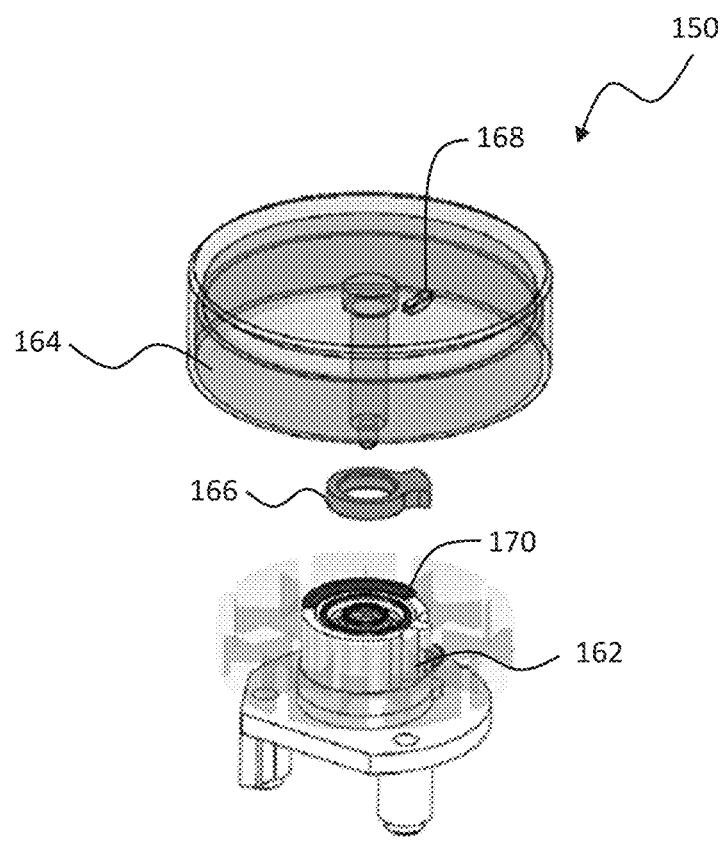
FIG. 20 is an exploded perspective view of a motor body of the gimbal motor of FIG. 19.

In one embodiment, the motor body 150 includes a stator part 162, a rotor part 164, and a shift ring 166 as illustrated in FIG. 20. When the rotor part 164 rotates, a first limit point 168 rotates at the same time. When the first limit point 168 contacts the shift ring 166, it drives the shift ring 166 to rotate. After the shift ring 166 is rotated by a certain angle and contacts a second limit point 170, the rotation will stop, thereby achieving an angular limit of four hundred fifty (450) degrees. It should be appreciated that the advantage of this configuration over conventional angular brushless gimbal motors is that only one extra part, the shift ring 166, is used to achieve a large-angle limit without increasing the size of the original motor body 150. It should also be appreciated that the rotation travel range of the gimbal motor 132 can be adjusted from three hundred sixty degrees (360°) to seven hundred twenty degrees (720°) according to practical need.

Signal Routing Scheme

Figure 21:
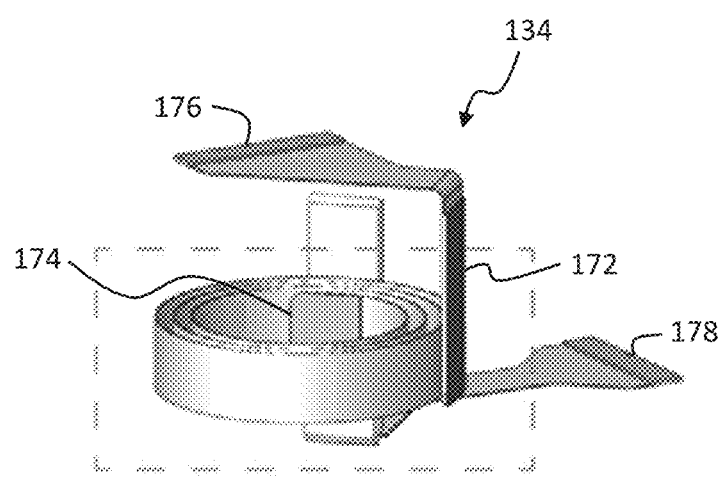
FIG. 21 is a perspective view of a vortex section of a flexible printed cable (FPC) of the inner module of FIG. 14.

The signal of the camera 53A, 52B is transmitted to the transfer board through the FPC 134, and then transmitted to the main board through the FPC 134. As illustrated in FIG. 21, a starting point 172 of a vortex section of the FPC 134 is fixed on the rotor part 164, and an end point 174 is fixed on the stator part 162. When the gimbal motor 132 rotates, the vortex section of the FPC 134 can provide the corresponding rotation angle. It should be appreciated that a first connecting point 176 of the FPC 134 is connected to a transfer board and a second connecting point of the FPC 134 is connected to a main board.

Figure 22:
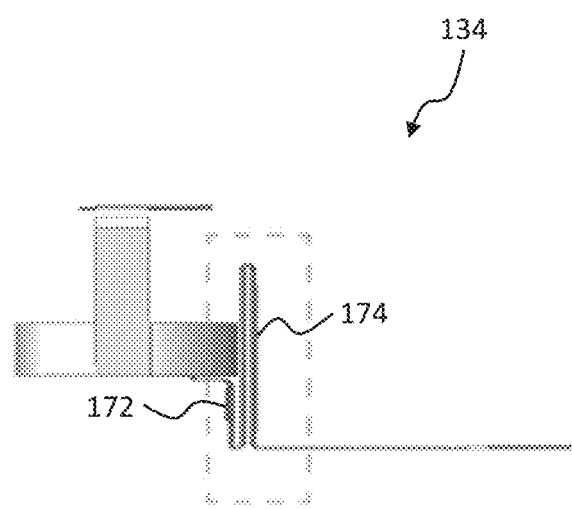
FIG. 22 is an elevational view of an S-shaped portion of the FPC of the inner module of FIG. 14.
Figure 23:
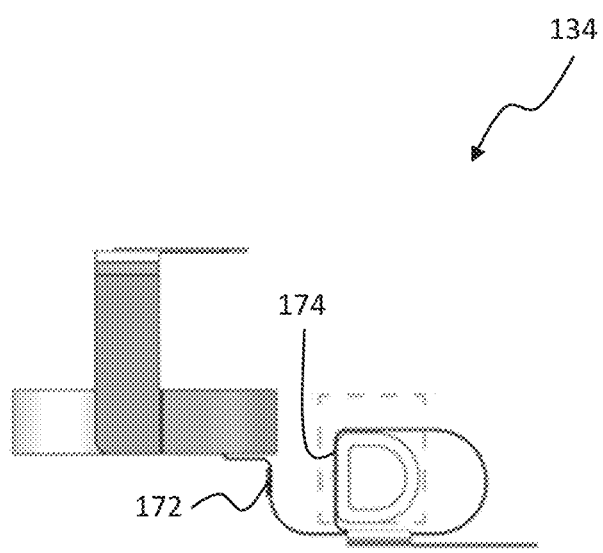
FIG. 23 is an elevational view of a D-shaped portion of the FPC of the inner module of FIG. 14.

As illustrated in FIG. 22, the starting point 172 of an S-shaped portion of the FPC 134 is fixed on an inner layer of the FPC 134, and the end point 174 is fixed on an outer layer of the FPC 134. When bouncing up or being pushed down, the S-shaped portion of the FPC 134 can be dynamically bent. As illustrated in FIG. 23, the starting point 172 of a D-shaped portion of the FPC 134 is fixed on the inner layer of the FPC 134, the end point 174 is fixed on the D-shaped portion, and the D-shaped portion is fixed with the outer layer of the FPC 134. When bouncing up or being pushed down, the D-shaped portion of the FPC 134 can be dynamically bent. It should be appreciated that, compared to existing technologies, this configuration provides two-stage bouncing and push-push function with the use of four hundred fifty (450) degrees brushless gimbal motor 132 and one-piece FPC 134 to achieve omnidirectional obstacle avoidance, reducing the complexity of the unmanned aerial system 12.

Automatic Binocular Lifting Structure

Figure 24:
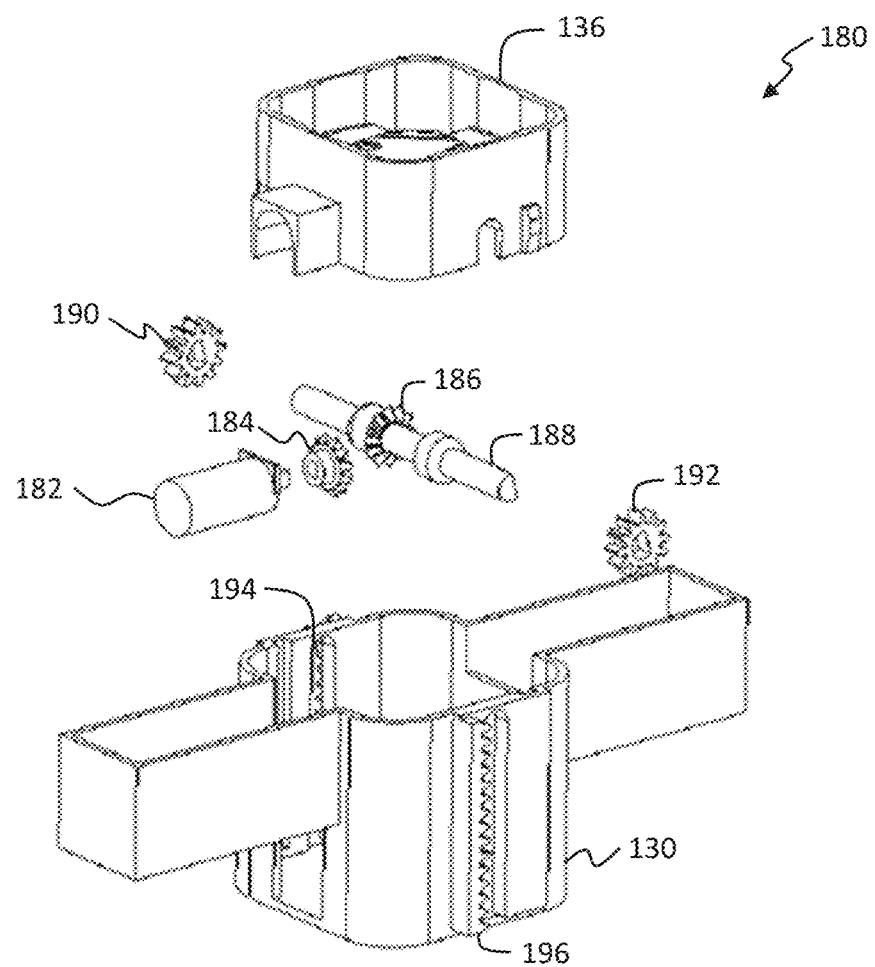
FIG. 24 is an exploded view of an automatic binocular lifting structure, according to an embodiment of the present invention, of the rotatable binocular camera system of FIG. 10.
Figure 25:
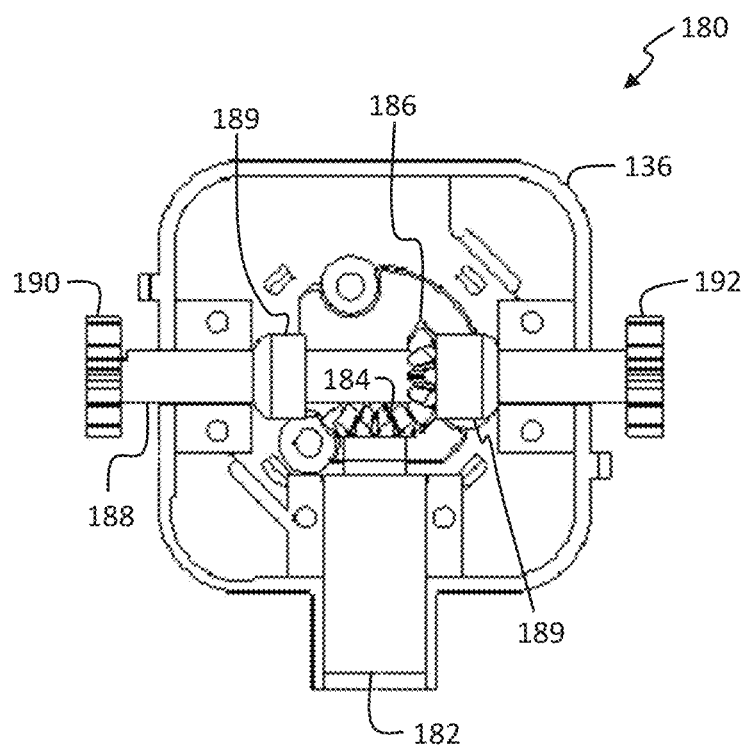
FIG. 25 is a top view of the automatic binocular lifting structure of FIG. 24.
Figure 26:
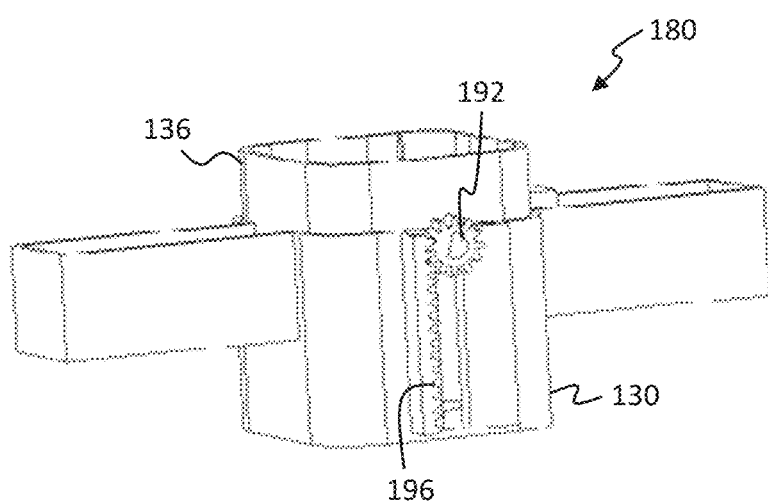
FIG. 26 is a perspective view of a portion of the automatic binocular lifting structure of FIG. 24.

Referring to FIGS. 23-25, an embodiment of an automatic binocular lifting structure or mechanism, according to the present invention, for the rotatable binocular camera system 100 is shown. In one embodiment, an automatic binocular lifting structure or mechanism, generally indicated at 180, is located at the central portion 102A of the inner bottom 136 to drive a rotary mechanism and the binocular arm module 130. An optional embodiment is that the rotary mechanism is located at the central portion 102A of the inner bottom 136, and the automatic binocular lifting structure 180 is connected with a rotor part of a rotary motor of the rotary mechanism. The automatic binocular lifting structure 180 only drives the binocular arm module 130, and the rotary mechanism drives automatic binocular lifting structure 180 to rotate in accordance with the binocular arm module 130. In other embodiments, manually bouncing up or being pressed down can be achieved with power-driven methods such as: a) motor (servo) drives a gear and rack to move the binocular arm module 130 up or down; b) the motor drives a screw shaft and a screw to move the binocular arm module 130 up or down; or c) the motor (servo) drives a crank connecting rod to move the binocular arm module 130 up or down.

Referring to FIG. 24, an automatic binocular lifting structure 180, according to an embodiment of the present invention, of the rotatable binocular camera system 100 is shown. In this embodiment, the automatic binocular lifting structure 180 includes a micromotor 182 mounted on the rotating motor base or inner bottom 136. The automatic binocular lifting structure 180 also includes a driving gear 184 and the micromotor 182 is connected at one end with the driving gear 184. The driving gear 84 includes a plurality of teeth. The automatic binocular lifting structure 180 includes a transmission gear 186 and the driving gear 184 is joined with the transmission gear 186. The transmission gear 186 includes a plurality of teeth. The automatic binocular lifting structure 180 also includes a transmission shaft 188 extending axially and the transmission gear 186 is fixedly connected with the transmission shaft 188 between the axial ends thereof. The transmission shaft 188 is fixed on the rotating motor seat or binocular arm module 130. The transmission shaft 188 has a pair of axial spaced axial limiters 189 that prevent axial movement of the transmission shaft 188. The automatic binocular lifting structure 180 includes a first lifting gear 190 and a second lifting gear 192 at the ends of the transmission shaft 188 and the transmission shaft 188 is connected to the first lifting gear 190 and the second gear 192. The first lifting gear 190 and second lifting gear 192 include a plurality of teeth. The automatic binocular lifting structure 180 further includes a first lifting rack 194 and a second lifting rack 196, and the first lifting gear 190 and the second lifting gear 192 are joined or engage with the first lifting rack 194 and the second lifting rack 196. The first lifting rack 194 and second lifting rack 196 are formed on the binocular arm module 130. The first lifting rack 194 and second lifting rack 196 include a plurality of teeth.

In operation of the automatic binocular lifting structure 180, the micromotor 182 drives the drive gear 184, the drive gear 184 transmits the rotational force to the transmission gear 186, the transmission gear 186 drives the transmission shaft 188, and the transmission shaft 188 drives the first lifting gear 190 and the second lifting gear 192. The first lifting gear 190 and the second lifting gear 192 rotate synchronously and engage with the first lifting rack 194 and the second lifting rack 196. The first lifting gear 190 moves up and down within the length of the first lifting rack 194 by being joined or engaged with the first lifting rack 194 and the second lifting gear 192 moves up and down within the length of the second lifting rack 196 by being joined or engaged with the second lifting rack 196. It should be appreciated that the automatic lifting of the binocular rotating platform or arm module 130 is realized by one driving motor and means of gear transmission.

Although omitted for conciseness, the preferred embodiments include every combination and permutation of the various system components and the various method processes, wherein the method processes can be performed in any suitable order, sequentially or concurrently.

As a person skilled in the art will recognize from the previous detailed description and from the figures and claims, modifications and changes can be made to the preferred embodiments of the invention without departing from the scope of this invention defined in the following claims.

What is claimed is:

1. An aerial system, comprising:
   a body;
   a lift mechanism coupled to the body;
   a processing system;
   at least one camera; and
   wherein the processing system includes a rotatable binocular camera system coupled to the body to retract into the body when not in use and to extend above the body when in use to achieve three hundred sixty (360) degree omnidirectional obstacle avoidance, wherein the rotatable binocular camera system includes an inner module, a first spring, a middle module, a second spring, and an outer module.

2. The aerial system as set forth in claim 1 wherein the rotatable binocular camera system also includes push-push socket slot, Hall-effect sensor board, outer block, and a middle block.

3. The aerial system as set forth in claim 2 wherein the middle module includes at least one guiding slider and the outer module includes at least one a guiding slot in which the guiding slider can slide inside the guiding slot, and an upward force is provided through the first spring to achieve the first-stage bouncing/sliding-up.

4. The aerial system as set forth in claim 2 wherein the inner module includes at least one guiding slider and the middle module includes at least one guiding chute and the guiding slider and the guiding chute cooperate with each other to provide an upward force through the second spring and achieve the second-stage bounce with the middle block which provides limit.

5. The aerial system as set forth in claim 2 wherein the inner module includes an adapter board, binocular arm module, gimbal motor, FPC cable and connector, inner bottom, and bent wire hook.

6. The aerial system as set forth in claim 5 wherein the binocular arm module comprises a pair of cameras, a line laser, and a magnet coupled to the body.

7. The aerial system as set forth in claim 5 wherein the gimbal motor includes a motor body, a one-piece FPC, a magnet, and a cover plate.

8. The aerial system as set forth in claim 7 wherein the motor body includes a stator part, a rotor part, and a shift ring.

9. The aerial system as set forth in claim 5 including an automatic binocular lifting structure to move the binocular arm module up or down relative to the body.

* * * * *